US012576528B2

(12) United States Patent
Takeuchi et al.

(10) Patent No.:  US 12,576,528 B2
(45) Date of Patent:  Mar. 17, 2026

(54) TAPE MATERIAL APPLICATOR AND COMPUTER PROGRAM

(71) Applicant: TECHNO OLYMPUS CO. LTD., Nissin (JP)

(72) Inventors: Minoru Takeuchi, Nissin (JP); Hiromoto Ito, Nissin (JP); Yusuke Tanaka, Nissin (JP)

(73) Assignee: Techno Olympus Co. LTD., Nissin (JP)

( * ) Notice: Subject to any disclaimer, the term of this patent is extended or adjusted under 35 U.S.C. 154(b) by 124 days.

(21) Appl. No.: 18/574,605

(22) PCT Filed: Oct. 28, 2022

(86) PCT No.: PCT/JP2022/040512
§ 371 (c)(1),
(2) Date: Dec. 27, 2023

(87) PCT Pub. No.: WO2024/089893
PCT Pub. Date: May 2, 2024

(65) Prior Publication Data
US 2025/0073903 A1     Mar. 6, 2025

(51) Int. Cl.
*B25J 9/16* (2006.01)
*B25J 11/00* (2006.01)
*B25J 15/00* (2006.01)

(52) U.S. Cl.
CPC ........... *B25J 9/1664* (2013.01); *B25J 9/1679* (2013.01); *B25J 11/005* (2013.01); *B25J 15/0019* (2013.01)

(58) Field of Classification Search
CPC ...... B25J 9/1664; B25J 9/1679; B25J 11/005; B25J 15/0019; B25J 9/16; B65C 1/04; B65H 35/00; B65H 35/06
See application file for complete search history.

(56) References Cited

U.S. PATENT DOCUMENTS 4,750,968 A * 6/1988 Sweeny .............. E04F 21/1655
156/577
5,573,626 A * 11/1996 Rossini ................. B65H 23/16
156/361
(Continued)

FOREIGN PATENT DOCUMENTS

CA      3224100 A1 * 4/2024 ............ B25J 9/1664
CN      1471438 A * 1/2004 ............ B65H 35/00
(Continued)

OTHER PUBLICATIONS

CN_106019445_A_I_translation (Year: 2016).*
(Continued)

*Primary Examiner* — Kyle T Johnson
(74) *Attorney, Agent, or Firm* — Womble Bond Dickinson (US) LLP

(57)     ABSTRACT

The invention provides a tape material applicator and computer program capable of applying relatively short tape materials and reducing the difficulty in tape application. The tape material applicator unit (60), mounted on the sixth axis of a robot, includes a disc-shaped member (50) and a roller swing mechanism (80). The tape material clamping device (200), attached to the disc-shaped member (50), clamps one end (304) of the tape material (300), while the guide (100) attached to the roller swing mechanism (80), holds the other end (305) of the tape material (300). The roller (90) presses the tape material (300) onto the workpiece (40). The tape material (300) is applied from one end (304) to the other end (305) along the application path by pressing with the roller (90), while maintaining the unattached part of the tape material (300) elevated from the workpiece (40).

4 Claims, 16 Drawing Sheets

(56)　　　　　References Cited

U.S. PATENT DOCUMENTS

| | | | | |
|---|---|---|---|---|
| 8,579,001 | B2 * | 11/2013 | Sakamoto .......... | B65H 35/0033 |
| | | | | 156/577 |
| 2002/0124967 | A1 * | 9/2002 | Sharp ................ | B65H 35/0013 |
| | | | | 156/496 |
| 2004/0140039 | A1 * | 7/2004 | Yamamoto ............. | B29C 63/02 |
| | | | | 156/73.6 |
| 2022/0112406 | A1 * | 4/2022 | Kamio ................. | B32B 27/308 |
| 2025/0073903 | A1 * | 3/2025 | Takeuchi ............... | B25J 11/005 |

FOREIGN PATENT DOCUMENTS

| | | | | | |
|---|---|---|---|---|---|
| CN | 106019445 | A | * | 10/2016 | .......... G02B 5/3033 |
| DE | 10254450 | A1 | * | 7/2003 | .......... H10N 30/053 |
| JP | 01271222 | A | | 10/1989 | |
| JP | 6210741 | A | | 8/1994 | |
| JP | 834419 | A | | 2/1996 | |
| JP | 9202515 | A | | 8/1997 | |
| JP | 2760930 | B2 | * | 6/1998 | |
| JP | 2009202281 | A | * | 9/2009 | .............. B25J 19/06 |
| JP | 2017197309 | A | * | 11/2017 | |
| JP | 2018024205 | A | | 2/2018 | |
| JP | 2022065833 | A | * | 4/2022 | |
| WO | WO-9014299 | A1 | * | 11/1990 | ............. B65H 35/06 |

OTHER PUBLICATIONS

CN_1471438_A_I_translation (Year: 2004).*
DE_10254450_A1_I_translation (Year: 2003).*
JP_2760930_B2_I_translation (Year: 1998).*
JP2017197309A translation (Year: 2017).*
WO_9014299_A1_I_translation (Year: 1990).*
JP_2022065833_A_I_translation (Year: 2022).*
JP-2009202281-A translation (Year: 2009).*
The International Search Report of the International Searching Authority for International Application No. PCT/JP/2022/040512.

* cited by examiner

FIG. 5 (A) Unclamp
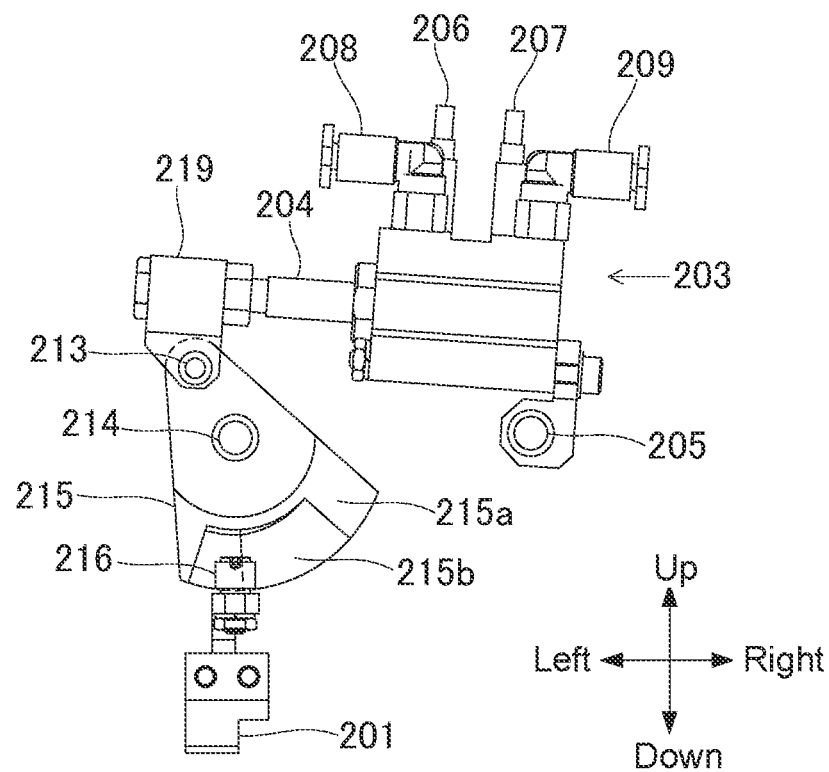
FIG. 5 (B) Clamp
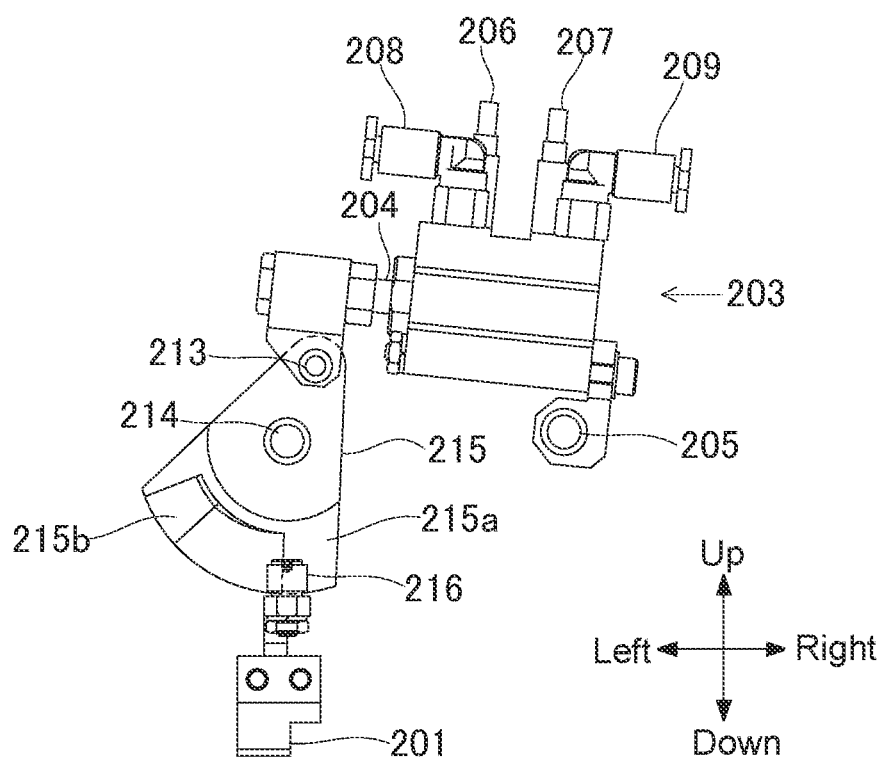

Up

Back ←——→ Front

Down

Up

Back ←——→ Front

Down

FIG. 10

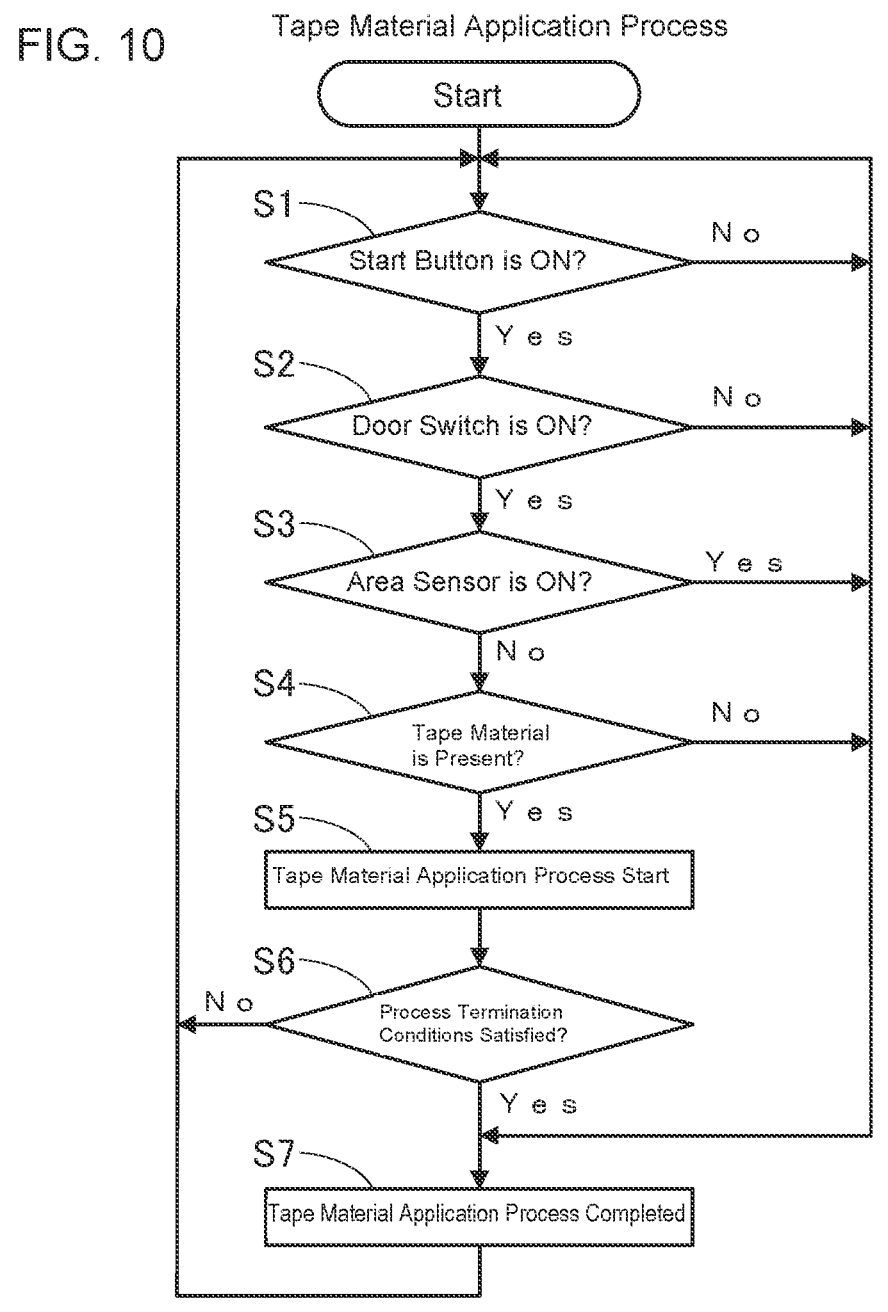

Tape Material Application Process

Start

S1
Start Button is ON?  No

Yes

S2
Door Switch is ON?  No

Yes

S3
Area Sensor is ON?  Yes

No

S4
Tape Material
is Present?  No

Yes

S5
Tape Material Application Process Start

S6
No  Process Termination
Conditions Satisfied?

Yes

S7
Tape Material Application Process Completed

Up

Left ← → Right

Down

Up

Left ◄ ─ ─ ─ ► Right

Down

TAPE MATERIAL APPLICATOR AND COMPUTER PROGRAM

CROSS-RELATED APPLICATIONS

This specification is a national stage application filed under 35 U.S.C. 371 based on International Patent Application No. PCT/JP2022/040512, filed Oct. 28, 2022, entitled "TAPE MATERIAL APPLICATOR AND COMPUTER PROGRAM", which is incorporated herein by reference in its entirety.

TECHNICAL FIELD

This invention relates to a tape material applicator and a computer program that utilizes a robot for applying tape material to a workpiece.

TECHNICAL BACKGROUND

Traditionally, a technique has been known wherein a circular vacuum chuck is attached to the hand of a multi-jointed robot. The tape material is adsorbed onto the outer peripheral surface of this vacuum chuck and is wound up. The tape material is applied to the workpiece by pressing and rotating the outer peripheral surface of the vacuum chuck against the workpiece (refer to Patent Document 1).

PRIOR ART DOCUMENTS

Patent Documents

Patent Document 1: Japanese Unexamined Patent Publication No. 1-271222

SUMMARY OF THE INVENTION

Problems to be Solved by the Invention

However, in the conventional technology mentioned above, the vacuum chuck is designed with vacuum holes for suctioning the tape material arranged at predetermined intervals in the circumferential direction. This makes it difficult to use relatively short lengths of tape material that do not reach the vacuum holes.

Also, in the conventional technology, when there are recesses smaller in diameter than the vacuum chuck along the tape material application path, the outer surface of the vacuum chuck lifts away from the walls of the recess, making it impossible to press and apply the tape material into these recesses.

Additionally, in the conventional technology, when there are obstructions such as protrusions next to the tape material application path, the outer edge of the vacuum chuck may interfere with these obstructions, making it difficult to apply the tape material.

In other words, the conventional technology has the problem of difficulty in applying relatively short lengths of tape material, and there are relatively many cases where it is difficult to apply the tape material.

Therefore, the present invention was created to solve the aforementioned problems. It aims to provide a tape material applicator and a computer program capable of applying relatively short lengths of tape material, and also to reduce the relative frequency of cases where it is difficult to apply the tape material.

Means for Solving the Problems (First Aspect of the Invention)

To achieve the aforementioned objectives, the first aspect of the invention refers to a tape material applicator (1: FIG. 1) that applies tape material (300) having an adhesive layer (302: FIG. 7(B)) on its back surface, to a workpiece (40: FIG. 14) along a predefined application path (R: FIG. 14(B)) using a robot (10: FIG. 9), comprising:

an application mechanism (60: FIG. 1) mounted at the tip of the robot for applying the tape material (300) to the workpiece (40); and a control unit (500: FIG. 9);

wherein the application mechanism (60) includes;

a clamping device (200: FIG. 1) equipped with a clamping member (201: FIG. 1) for clamping one end (304: FIG. 1) of the tape material (300) and a driving device (203: FIG. 3) for operating the clamping member (201);

a holding member (100: FIG. 1) capable of holding the other end (305: FIG. 1) of the tape material (300); and a roller (90: FIG. 1) for pressing and applying the tape material (300) to the workpiece (40), wherein the control unit (500) controls the robot (10) and the driving device (203) to clamp one end (304) of the tape material (300) in the clamping member (201) and to hold the other end (305) of the tape material (300) in the holding member (100), and further controls the robot (10) to move the application mechanism (60) to the position where the tape material (300) is to be applied to the workpiece (40), furthermore, the other end (305) of the tape material (300) held by the holding member (100) is pressed and applied to the workpiece (40) by the roller (90), while maintaining the unapplied portion of the tape material (300) in a state of being elevated from the workpiece (40), and wherein the position and posture of the application mechanism (60) relative to the workpiece (40) are controlled, thus applying the tape material (300) from the other end (305) to the one end (304) by pressing with the roller (90) along the application path (R).

According to the first aspect of the invention, the other end of the tape material, held by the holding member, is pressed and applied to the workpiece by the roller, while maintaining the unapplied portion of the tape material lifted from the workpiece. This allows the position and posture of the application mechanism relative to the workpiece to be controlled, enabling the application of the tape material from the other end to one end by pressing with the roller along the application path. Therefore, the first aspect of the invention enables the application of relatively short lengths of tape material.

Additionally, the clamping member that clamps one end of the tape material only needs to be large enough to clamp that end, the holding member that holds the other end of the tape material only needs to be large enough to hold that end, and the roller that presses the tape material onto the workpiece only needs to be large enough to press it. This reduces the likelihood of the clamping member, holding member, and roller interfering with any obstructions such as protrusions alongside the tape material application path. Therefore, the first aspect of the invention can reduce the relative frequency of cases where it is difficult to apply the tape material.

(Second Aspect of the Invention)

The second aspect of the invention refers to a tape material applicator (1) according to the first aspect of the invention, having the tape material (300) detachably adhered to a supply unit (34: FIG. 1) for supplying the tape material (300), wherein the application mechanism (60) comprises a first rotary member (50: FIG. 1) with the clamping member (201) positioned radially from the center of rotation;

a first rotary shaft (64: FIG. 3) that pivotally supports the first rotary member (50) to enable its rotation;

a first biasing member (65: FIG. 1) urging the first rotary member (50), which rotates with the clamping member (201) clamping the tape material (300), to return to its pre-rotation position;

a second rotary member (88: FIG. 1) provided with the holding member (100) and roller (90) at one end;

a second rotary shaft (86: FIG. 1) allowing rotation of the other end of the second rotary member (88); and a second biasing member (66: FIG. 1) urging the second rotary member (88), which rotates when the roller (90) presses the tape material (300) onto the workpiece (40), to return to its pre-rotation position, wherein the control unit (500) controls the robot (10) to clamp one end (304) of the tape material (300) in the clamping member (201) and hold the part of the tape material (300) other than one end (304) in the holding member (100), displacing the application mechanism (60) so that the holding member (100), while holding the tape material (300), approaches the clamping position of the clamping member (201), rotating the first rotary member (50) around the first rotary shaft (64) against the biasing force of the first biasing member (65) (FIG. 11), and by rotating the first rotary member (50) back to its pre-rotation position using the biasing force of the first biasing member (65), the tape material (300), which is adhered to the supply unit (34), is peeled from one end (304) being clamped by the clamping member (201) while the holding position of the tape material (300) by the holding member (100) moves to the other end (305) of the tape material (300) in its held state, thus displacing the application mechanism (60) (FIGS. 12 and 13), and the clamping member (201) clamps one end (304) of the tape material (300) and the holding member (100) holds the other end (305), moving the application mechanism (60) to the position for applying the tape material (300) to the workpiece (40) (FIG. 14), and the other end (305) of the tape material (300) held by the holding member (100) is pressed and applied to the workpiece (40) by the roller (90), while maintaining the unapplied portion of the tape material (300) elevated from the workpiece (40), and the tape material (300) is applied from the other end (305) to one end (304) by pressing with the roller (90) along the application path (R).

According to the second aspect of the invention, the control unit controls the robot such that while the clamping member clamps one end of the tape material, and the holding member holds the part of the tape material other than one end, the application mechanism is displaced, enabling the holding member, which holds the tape material, to approach the clamping position of the clamping member while the tape material is still held. This is achieved by rotating the first rotary member against the force exerted by the first biasing member, with the first rotary shaft serving as the center of rotation. Consequently, the second aspect of the invention ensures that when the tape material is peeled from one end clamped by the clamping member, the holding member is positioned near the clamping member, reducing the risk of the peeled tape material becoming detached from the holding member.

Moreover, according to the second aspect of the invention, the control unit allows the application mechanism to be displaced in such a way that, by the first rotary member rotating back to its original position using the force exerted by the first biasing member, the tape material adhered to the supply unit is peeled from one end being clamped by the clamping member, while the holding position of the tape material by the holding member moves to the other end of the tape material in its held state. Thus, the second aspect of the invention allows for the creation of a state where one end of the peeled tape material is clamped by the clamping member, and the other end of the tape material is held by the holding member.

In addition, the second aspect of the invention enables the control unit, by controlling the robot, to move the application mechanism to the position for applying the tape material to the workpiece while the clamping member clamps one end of the tape material and the holding member holds the other end.

Thus, the second aspect of the invention also allows the control unit to press and apply the other end of the tape material held by the holding member to the workpiece with the roller, and maintain the unapplied portion of the tape material lifted from the workpiece while pressing and applying the tape material from the other end to one end along the application path with the roller. Therefore, the second aspect facilitates the tape material being applied with minimal influence from its adhesive properties, making it easier to change direction during application.

Consequently, the second aspect of the invention provides that when the tape material is pressed onto the workpiece by the roller, if the pressing force exceeds a predetermined level, the second rotary member rotates around the second rotary shaft against the force of the second biasing member, absorbing the pressing force. This enables the roller to adjust to apply a consistent pressing force on the tape material. As a result, the second aspect enables the tape material to be applied with a uniform pressing force along the application path, preventing the risk of the tape material being crushed by excessive pressure or insufficient adhesion.

Similarly, according to the second aspect of the invention, when peeling the tape material detachably adhered to the supply unit, the force exerted by the first biasing member for returning the first rotary member to its pre-rotation position is utilized. This eliminates the need for actuators such as motors for rotating the first rotary member, thereby reducing the manufacturing cost of the tape applicator and lowering the failure rate.

(Third Aspect of the Invention)

The third aspect of the invention refers to a tape material applicator (1) according to the second aspect of the invention, wherein the first rotary shaft (64) and the second rotary shaft (86) are mutually parallel, and the clamping member (201), the holding member (100), and the roller (90) are each positioned radially from the center of rotation of the first rotary member (50), with the holding member (100) being positioned between the roller (90) and the clamping member (201).

Since the clamping member, the holding member, and the roller are each positioned radially from the center of rotation of the first rotary member, and the holding member is positioned between the roller and the clamping member, the position and posture of the application mechanism can be controlled to press the tape material with the roller while holding it with the holding member. Additionally, by controlling the position and posture of the application mechanism, the holding position of the holding member on the tape material can be moved along the tape material while pressing it with the roller. Furthermore, by controlling the position and posture of the application mechanism, the position of the clamping member holding one end of the tape material can be controlled, thus maintaining the lifted state of one end of the tape material from the workpiece while controlling the direction of tape material application to follow the application path.

(Fourth Aspect of the Invention)

The fourth aspect of the invention refers to a tape material applicator (1) according to any one of the first to third aspects of the invention, wherein the tape material (300) comprises a urethane resin layer (301: FIG. 7(B)) formed from urethane resin, and an adhesive layer (302) formed on the back surface of the urethane resin layer (301), with the adhesive layer (302) having a greater elastic modulus than the urethane resin layer (301).

In cases where the tape material comprises a urethane resin layer and an adhesive layer formed on the back surface of the urethane resin layer, and the adhesive layer has a greater elastic modulus than the urethane resin layer, it is easier for the tape material to deform and follow the direction of the roller's rotation on curved application paths. However, the adhesive layer, being less prone to deformation, may not easily change direction following the roller's rotation, leading to potential deviations from the application path or the tape material being misaligned relative to the workpiece.

Nevertheless, in the present invention, the clamping member clamps one end of the tape material, and the tape material can be applied from one end to the other along the application path by pressing with the roller, while maintaining the unapplied portion of the tape material lifted from the workpiece.

This means that the unadhered part of the tape material is not adhered to the workpiece, allowing for easy directional changes of the unadhered part by controlling the position and posture of the application mechanism. Thus, the aforementioned issues are avoided, enabling the accurate application of the tape material along curved application paths.

(Fifth Aspect of the Invention)

To achieve the aforementioned objectives, the fifth aspect of the invention refers to a computer program (503: FIG. 9) executed by the control unit (500) of a tape material applicator (1) comprising;

an application mechanism (60: FIG. 1) mounted at the tip of the robot for applying the tape material (300) to the workpiece (40) to apply tape material (300) having an adhesive layer (302: FIG. 7(B)) on its back surface, to a workpiece (40: FIG. 14) along a predefined application path (R: FIG. 14(B)) using a robot (10: FIG. 9); and a control unit (500: FIG. 9);

wherein the application mechanism (60) includes; a clamping device (200) equipped with a clamping member (201) for clamping one end (304) of the tape material (300) and a driving device (203) for operating the clamping member (201), a holding member (100) capable of holding the other end (305) of the tape material (300), and a roller (90) for pressing and applying the tape material (300) to the workpiece (40), wherein the computer program executed by the control unit (500) controls the robot (10) and the driving device (203) to clamp one end (304) of the tape material (300) in the clamping member (201) and to hold the other end (305) of the tape material (300) in the holding member (100), further moves the application mechanism (60) to the position for applying the tape material (300) to the workpiece (40), and further presses and applies the other end (305) of the tape material (300) held by the holding member (100) to the workpiece (40) with the roller (90), while maintaining the unapplied portion of the tape material (300) elevated from the workpiece (40), furthermore, controls the position and posture of the application mechanism (60) relative to the workpiece (40), thus applying the tape material (300) from the other end (305) to one end (304) by pressing with the roller (90) along the application path (R).

According to the fifth aspect of the invention, the other end of the tape material held by the holding member is pressed and applied to the workpiece by the roller. While maintaining the unapplied portion of the tape material lifted from the workpiece, the position and posture of the application mechanism relative to the workpiece are controlled, enabling the application of the tape material from the other end to one end by pressing with the roller along the application path.

Consequently, the fifth aspect of the invention allows for the application of relatively short lengths of tape material.

Moreover, the clamping member that clamps one end of the tape material only needs to be large enough to clamp that end, the holding member that holds the other end of the tape material only needs to be large enough to hold that end, and the roller that presses the tape material onto the workpiece only needs to be large enough to press it. This reduces the likelihood of the clamping member, holding member, and roller interfering with any obstructions such as protrusions alongside the tape material application path. Therefore, the fifth aspect of the invention can reduce the relative frequency of cases where it is difficult to apply the tape material.

It should be noted that the reference numerals and figure numbers mentioned in the above parentheses indicate the correspondence with the specific means described in the embodiments to be described later.

Effects of the Invention

According to the present invention, it is possible to provide a tape material applicator and a computer program that can apply relatively short lengths of tape material, and also reduce the relative frequency of cases where it is difficult to apply the tape material.

BRIEF DESCRIPTION OF THE DRAWINGS

FIGS. 5(A) and (B) are both explanatory diagrams of the operational state of the tape material clamping device, where FIG. 5(A) shows the state when the tape material is not clamped (unclamped), and FIG. 5(B) shows the state when the tape material is clamped.

FIG. 10 is a flowchart showing the main processing flow executed by the CPU in the control unit shown in FIG. 9.

MODES FOR CARRYING OUT THE INVENTION

The tape material applicator according to an embodiment of the present invention will be described with reference to the drawings.

(Main Configuration)

First, the main configuration of the tape material applicator of this embodiment will be explained with reference to the drawings.

Figure 1:
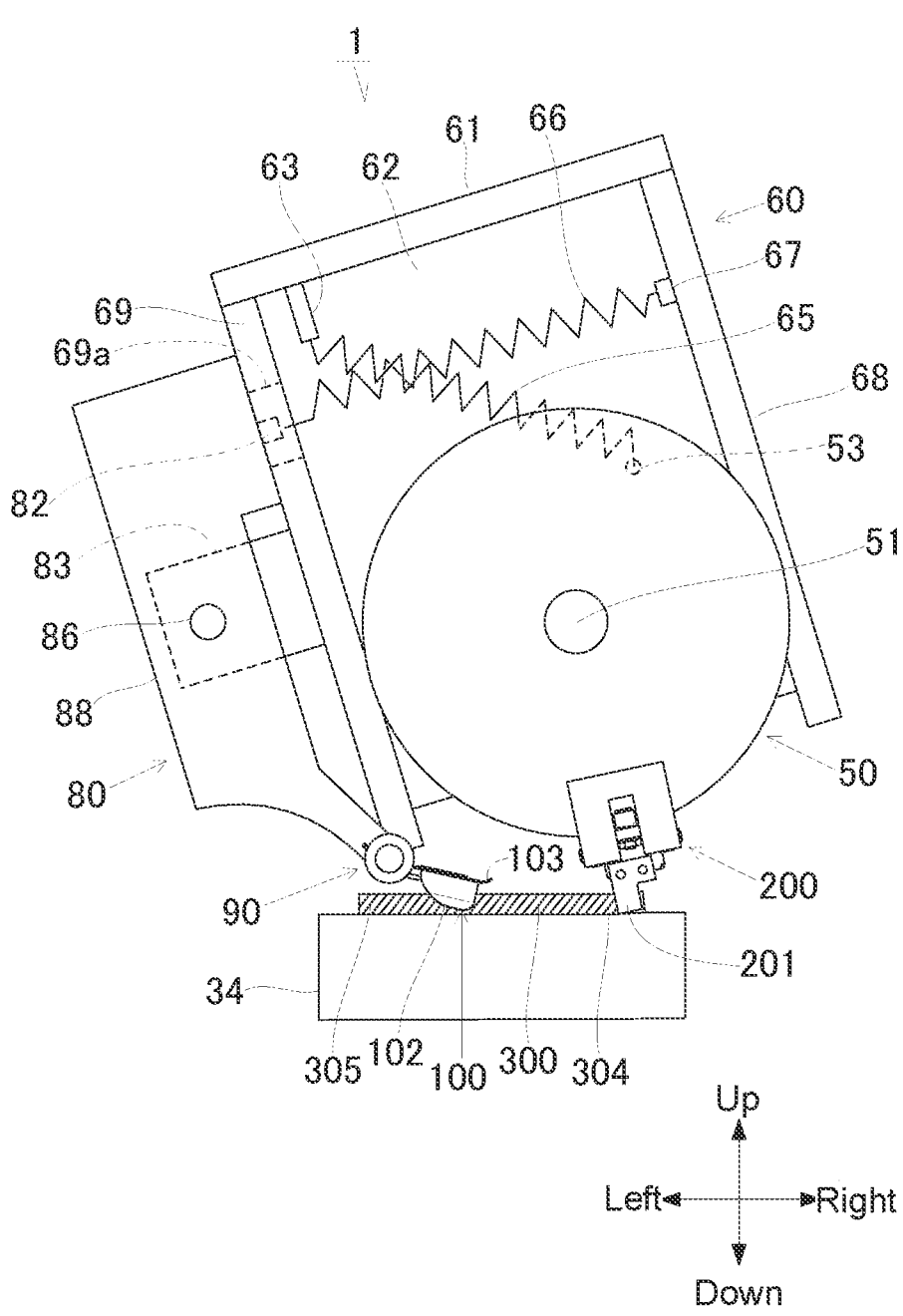
FIG. 1 is a front view of a tape material applicator according to an embodiment of the present invention.
Figure 9:
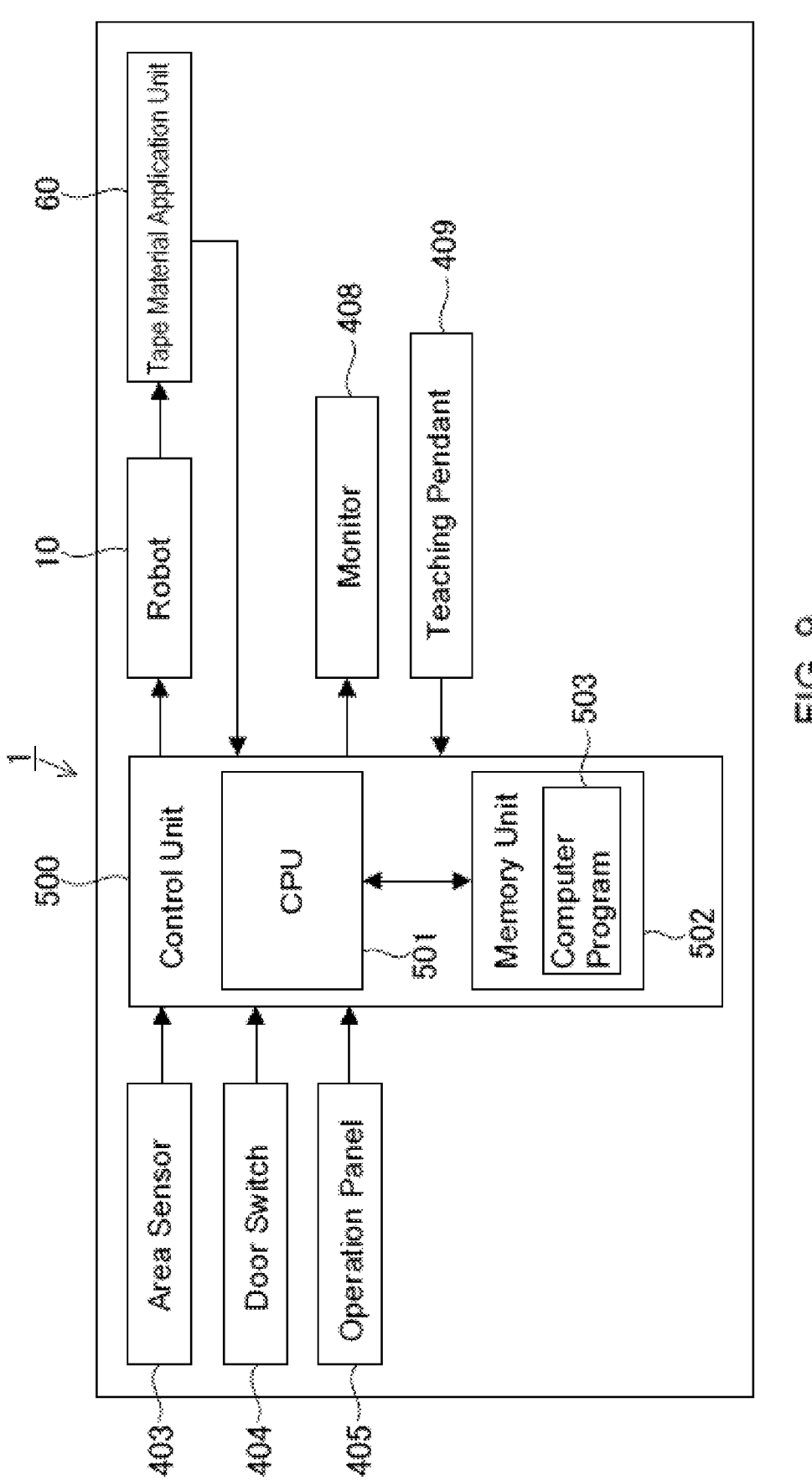
FIG. 9 is an explanatory diagram in block form, showing the main electrical configuration of the tape material applicator shown in FIG. 1.

As shown in FIG. 1, the tape material applicator 1 of this embodiment includes a tape material application unit 60 and a robot 10 (shown in FIG. 9). The robot 10 is a vertical multi-joint 6-axis robot, and the tape material application unit 60 is detachably mounted on the sixth axis of the robot 10. Normally, in a standard vertical multi-joint 6-axis robot, a robot hand (not shown) is mounted on the wrist part. However, in the tape material applicator 1 of this embodiment, the tape material application unit 60 is mounted in place of the robot hand.

[Configuration of the Tape Material Application Unit]

Next, the configuration of the tape material application unit 60 will be explained with reference to the drawings.

Figure 14:
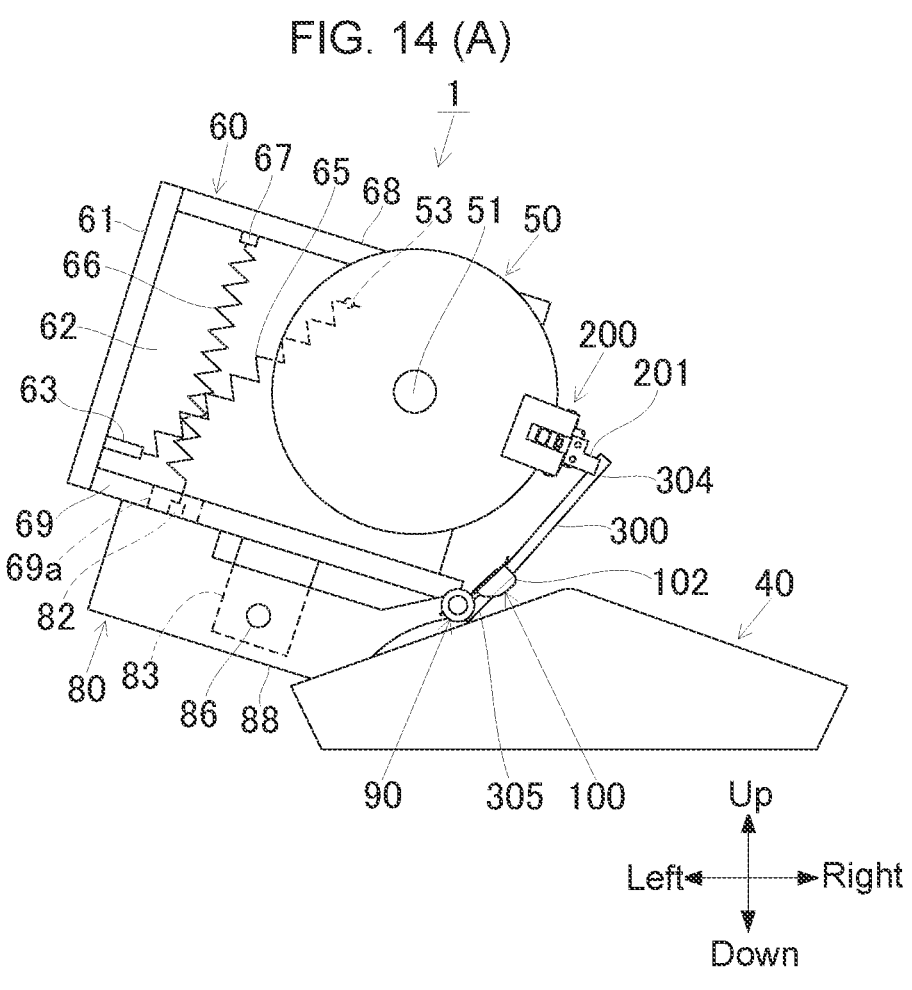
FIG. 14 is a perspective view showing the state of applying the other end of the tape material to the workpiece.
Figure 14:
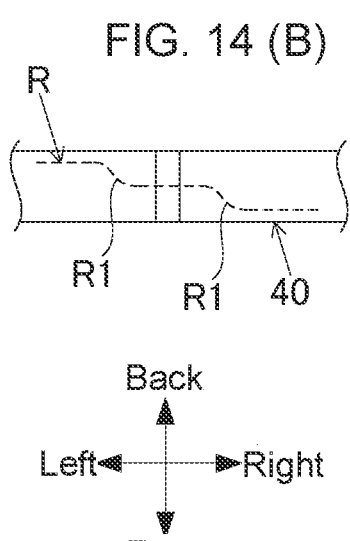
Figure 15:
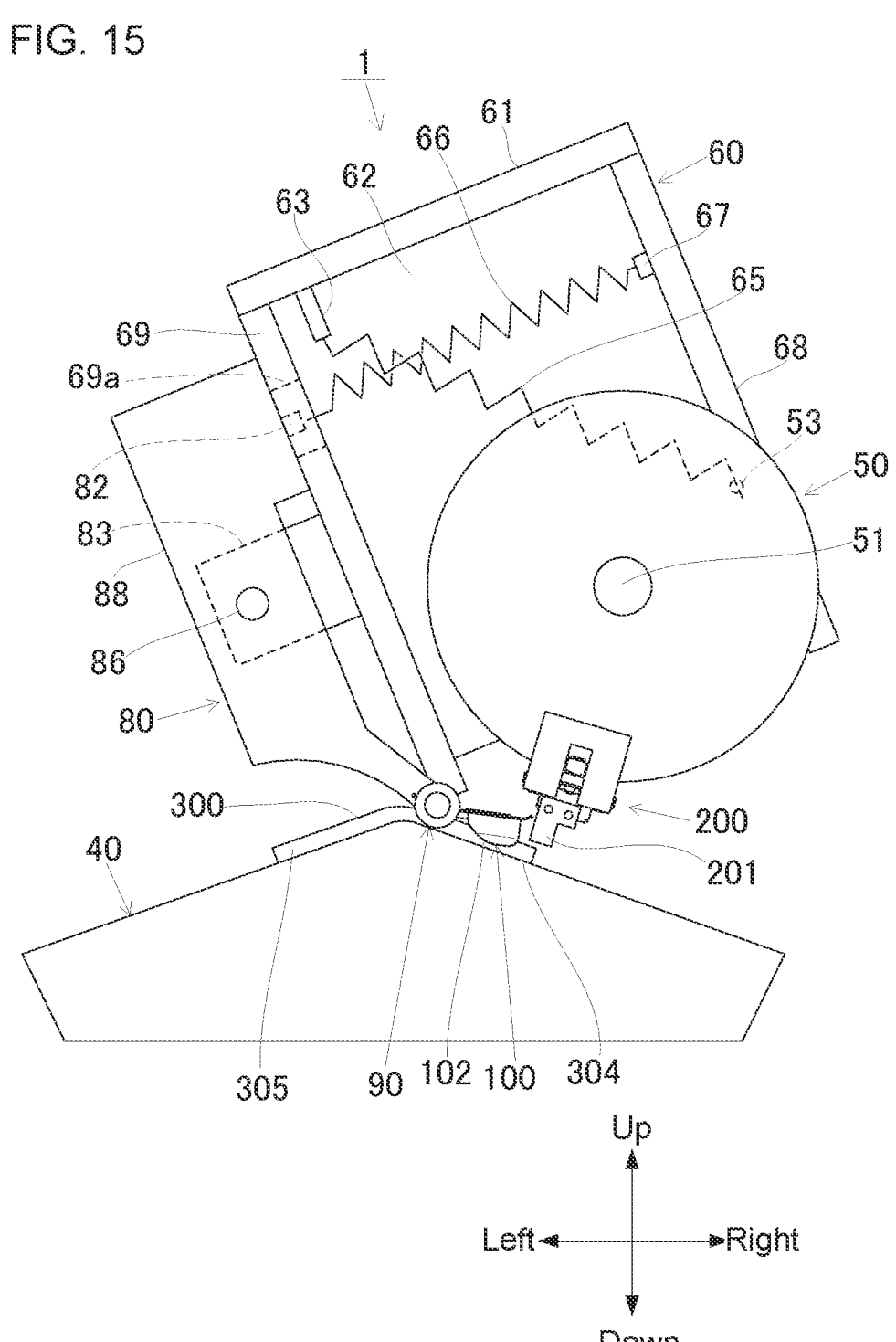
FIG. 15 is a perspective view showing the process of applying the tape material along the application path.
Figure 16:
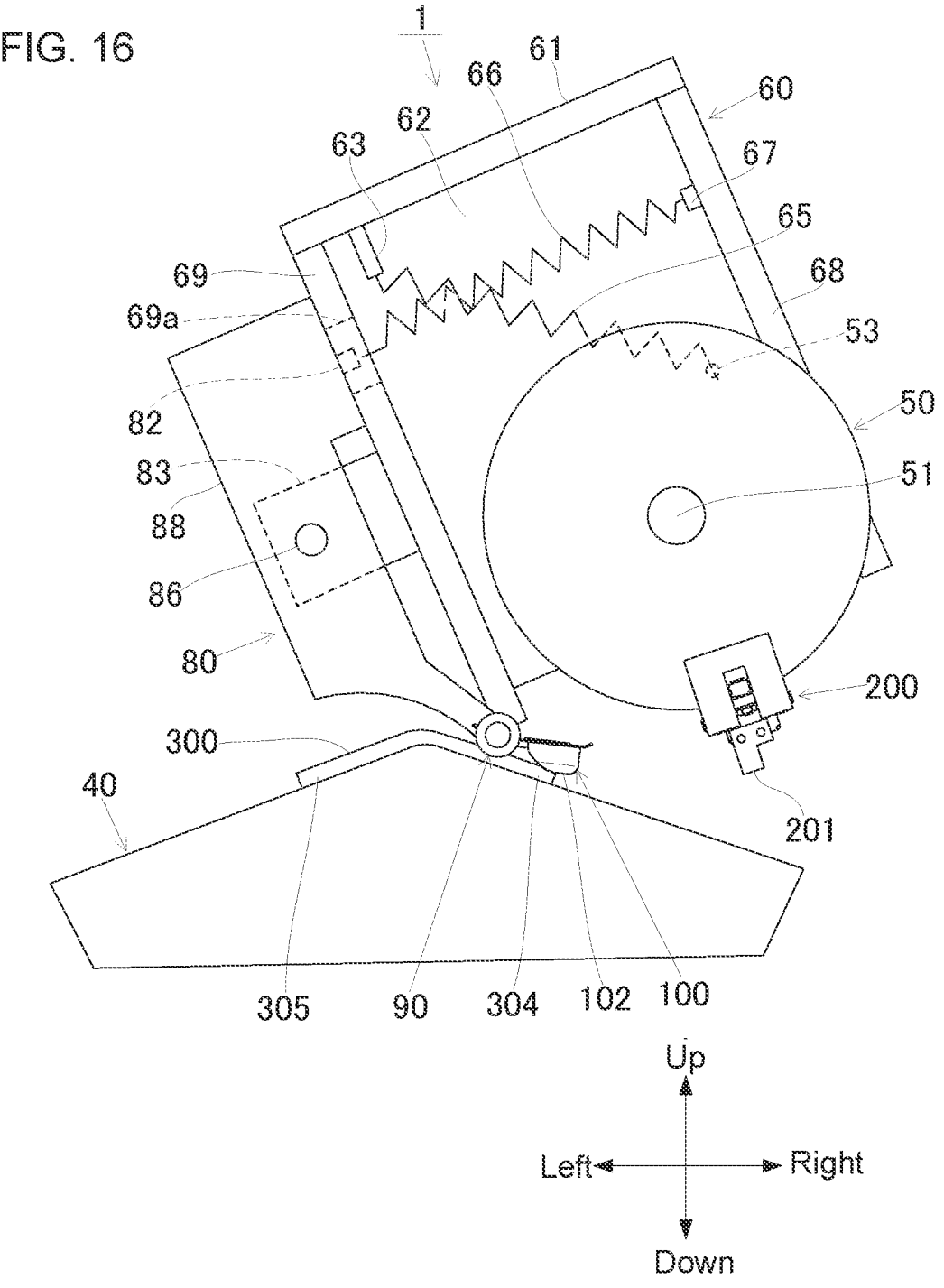
FIG. 16 is a perspective view showing the process of applying the tape material along the application path.

As shown in FIGS. 14 to 16, the tape material application unit 60 is a device for applying the tape material 300 to the workpiece 40 by pressing it with the roller 90 along a predetermined application path R (shown in FIG. 14(B)) set on the workpiece 40. As shown in FIG. 1, the tape material application unit 60 includes a robot mounting section 61 for attaching the tape material application unit 60 to the sixth axis of the robot 10. The robot mounting section 61 is formed in a rectangular plate shape that is long in the left-right direction. A plate-shaped back section 62 is attached to the back (rear side) of the robot mounting section 61, with a plate-shaped side section 68 on the right and a plate-shaped side section 69 on the left, respectively attached to the back section 62. The robot mounting section 61, back section 62, side section 68, and side section 69 together constitute the outer frame of the tape material application unit 60.

Figure 2:
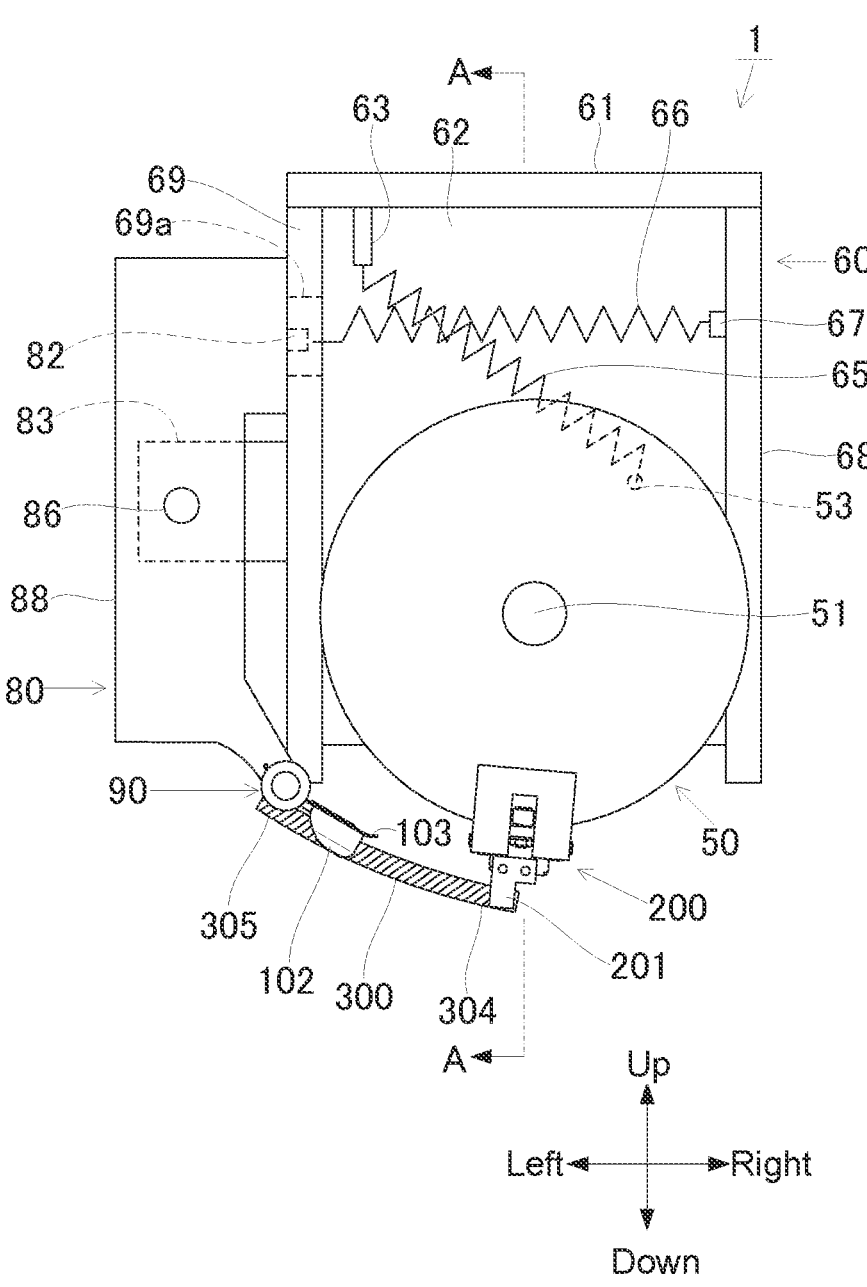
FIG. 2 is a front view of the tape material applicator.
Figure 3:
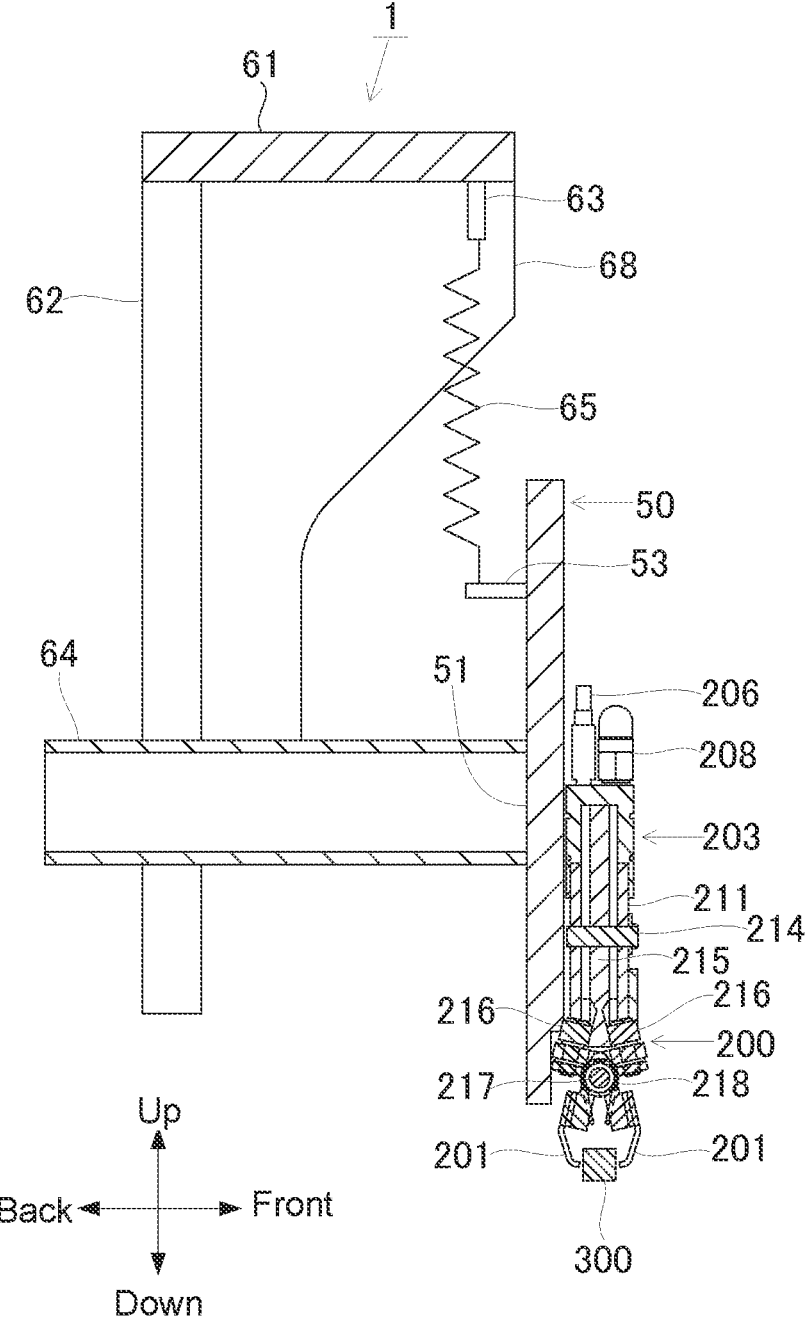
FIG. 3 is a sectional view taken along line A-A of FIG. 2.

As shown in FIG. 3, the back section 62 is equipped with the first rotary shaft 64, which is rotatably supported via bearings (not shown). The front end of the first rotary shaft 64 is attached to the rotation center 51 (shown in FIG. 2) of the disk-shaped member 50. As shown in FIG. 3, the tape material clamping device 200 for clamping (holding) the tape material 300 is attached to the circumferential surface of the disk-shaped member 50. Also, an air cylinder 203 for driving the tape material clamping device 200 is attached to the front surface of the disk-shaped member 50. It should be noted that in FIGS. 1, 2, and 11-16, other than FIG. 3, the tape material clamping device 200 is omitted.

As shown in FIG. 3, near the outer circumference of the back surface of the disk-shaped member 50, a spring locking section 53 is attached, and one end of the first spring 65 is locked in this spring locking section 53. As shown in FIG. 2, a spring locking section 63 is attached to the left end of the back surface of the robot mounting section 61, and the other end of the first spring 65 is locked in this spring locking section 63. The disk-shaped member 50 can rotate clockwise against the biasing force of the first spring 65, and the disk-shaped member 50, having rotated clockwise, can return to its original position by rotating counterclockwise under the biasing force of the first spring 65. In this embodiment, the first spring 65 is a coil spring. The role of the disk-shaped member 50 when applying the tape material 300 to the workpiece 40 will be described later. The tape material application unit 60 is an example of the application mechanism of the present invention, the disk-shaped member 50 is an example of the first rotary member of the present invention, and the first spring 65 is an example of the first biasing member of the present invention.

[Configuration of the Tape Material Clamping Device]

Figure 4:
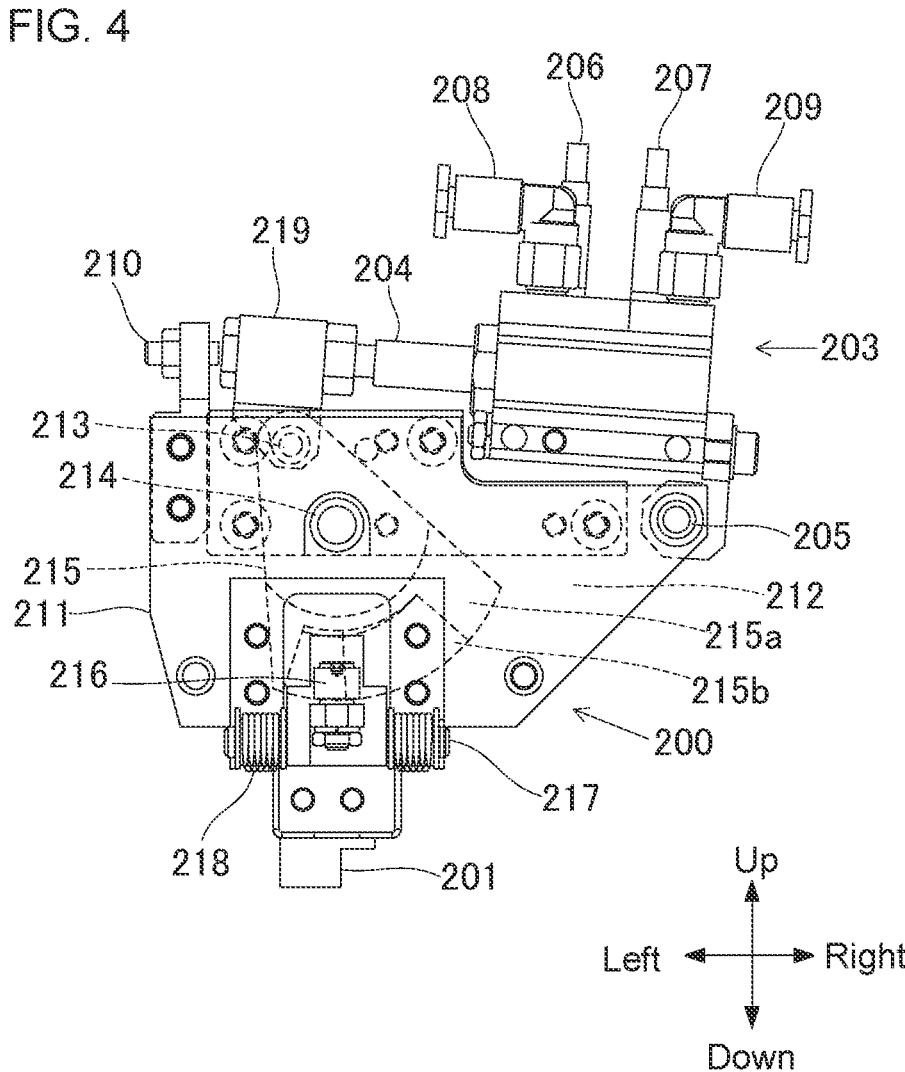
FIG. 4 is an explanatory diagram of the tape material clamping device.

As shown in FIGS. 3 and 4, the tape material clamping device 200 comprises a pair of opposing clamping fixtures 201, 201 for clamping (holding) the tape material 300, a pair of cam followers 216, 216 for operating each clamping fixture 201 in clamping (holding) and unclamping (non-holding) actions, a cam 215 (shown in FIGS. 5 and 6) for actuating each cam follower 216, an air cylinder 203 for rotating the cam 215, and opposing frames 211, 212 (shown in FIG. 3).

At the lower end between frames 211 and 212, a rotary shaft 217 is rotatably supported, and a pair of clamping fixtures 201 are pivotally mounted on this rotary shaft 217. As shown in FIG. 3, each clamping fixture 201 is set facing each other. Each clamping fixture 201 has a vertical cross-section that is substantially in the shape of the letter "<", with their upper ends pivotally supported on the rotary shaft 217. The lower ends of each clamping fixture 201 are bent towards the opposing direction, and the tips of these bent portions are formed in a serrated shape. The tape material 300 is clamped by the tips of the opposing clamping fixtures 201.

As shown in FIGS. 3 and 4, torsion coil springs 218 are wound around both ends of the rotary shaft 217, and these torsion coil springs 218 bias each clamping fixture 201 in the unclamping direction. As shown in FIG. 3, on the frame 211 facing the upper end of the forward clamping fixture 201, a cam follower 216 is rotatably supported to enable the forward clamping fixture 201 to perform clamping and unclamping actions. Similarly, on the frame 211 facing the upper end of the rearward clamping fixture 201, a cam follower 216 is rotatably supported to enable the rearward clamping fixture 201 to perform clamping and unclamping actions.

Figure 6:
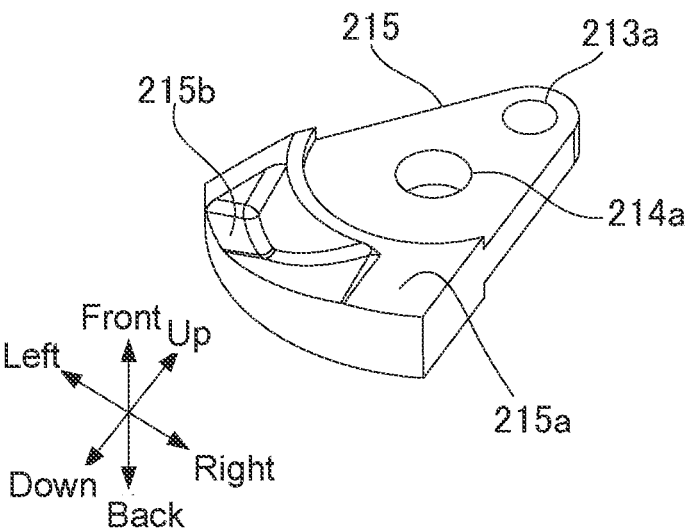
FIG. 6 is a perspective view of a cam equipped with the tape material clamping device.

As shown in FIG. 3, between frames 211 and 212, a cam 215 is pivotally supported on a cam rotary shaft 214. As shown in FIG. 6, on the lower right of the front surface of cam 215, a flat section 215a is formed, and to the left of this flat section 215a, a recess 215b is created. This recess 215b is formed to be large enough for the cam follower 216 to engage (drop into). Although not illustrated, on the rear surface of cam 215, both the flat section 215a and the recess 215b are formed in the same positions as on the front surface. Additionally, cam 215 has through holes, with hole 214a for inserting the cam rotary shaft 214 and hole 213a for inserting the connecting shaft 213, as shown in FIG. 4.

As shown in FIG. 4, air cylinders 203 are provided at the upper ends of frames 211 and 212. The rear end (right side in the drawing) of each air cylinder 203 is pivotally supported on a rotary shaft 205, which is inserted through frames 211 and 212. At the tip of the piston rod 204 of the air cylinder 203, a connecting member 219 is attached, on which the base end of cam 215 is pivotally supported by a connecting shaft 213. At the upper ends of frames 211 and 212, a range adjustment screw 210 is provided facing towards the connecting member 219 to adjust the movable range of the piston rod 204. The tip of the range adjustment screw 210 faces the tip of the connecting member 219, and by adjusting the protrusion length of the range adjustment screw 210, the extendable range of the piston rod 204 can be adjusted, thereby adjusting the rotation range of the cam 215.

The air cylinder 203 is equipped with a front-end detection sensor (not shown) that detects when the rear end of the piston rod 204 (right end in FIG. 4) is at the front end of the air cylinder 203 (left end in FIG. 4), that is, when the piston rod 204 is in an extended state. A front-end detection sensor output cable 206 is connected to this front-end detection sensor to output its detection signal to the control unit 500 (shown in FIG. 9). Additionally, the air cylinder 203 is equipped with a rear-end detection sensor (not shown) that detects when the rear end of the piston rod 204 (right end in FIG. 4) is at the rear end of the air cylinder 203 (right end in FIG. 4), that is, when the piston rod 204 is in a retracted state. A rear-end detection sensor output cable 207 is connected to this rear-end detection sensor to output its detection signal to the control unit 500 (shown in FIG. 9). Furthermore, the air cylinder 203 is provided with airports 208 and 209 for intake and exhaust of air to extend or retract the piston rod 204. The airports 208 and 209 are connected to an air compressor (not shown) that supplies compressed air.

As shown in FIG. 5(A), when the piston rod 204 is extended, the cam 215 rotates counterclockwise, and each cam follower 216 engages into the recess 215b of cam 215. As a result, as shown in FIG. 3, each cam follower 216 assumes an inwardly tilted posture. In this state, the tips of each clamping fixture 201 are separated from each other due to the biasing force of the torsion coil springs 218, that is, in the unclamped state where the tape material 300 is not clamped.

Furthermore, as shown in FIG. 5(B), when the piston rod 204 extends, the cam 215 rotates clockwise, causing each cam follower 216 to disengage from the recess 215b and roll onto the flat section 215a while rotating. Consequently, each cam follower 216 rotates against the biasing force of the torsion coil springs 218, changing into an upright posture. This brings the tips of each clamping fixture 201 closer together, clamping the tape material 300 (as shown in FIG. 1). The tape material clamping device 200 is an example of the clamping device of the present invention, with the pair of clamping fixtures 201, 201 being examples of the clamping members of the present invention. Additionally, the air cylinder 203 is an example of the driving device of the present invention.

[Roller Swing Mechanism]

As shown in FIGS. 1 and 2, the tape material application unit 60 includes a roller swing mechanism 80 for swinging the roller 90 and the guide 100. The roller swing mechanism 80 comprises an arm 88, a second rotary shaft 86, a bearing 83, the roller 90, the guide 100, and a bearing 89 (shown in FIG. 7(A)). A bearing 83 is fixed to the outer surface of the side section 69. The bearing 83 is formed in a plate shape, with its right side fixed to the side section 69. The second rotary shaft 86 is inserted through the bearing 83, and the arm 88 is pivotally supported (swingable) on this second rotary shaft 86. As shown in FIG. 2, a spring locking section 82 is inserted and fixed to the upper end of the arm 88, and the spring locking section 82 is movably inserted into a through-hole 69a formed in the side section 69. The arm 88 is an example of the second rotary member of the present invention.

At the base end of the spring locking section 82, one end of the second spring 66 is locked, and the other end of the second spring 66 is locked into a spring locking section 67, which is fixed to the inside of the right side section 68. In other words, the arm 88 is capable of rotating counterclockwise (anticlockwise) against the biasing force of the second spring 66, with the second rotary shaft 86 as the rotation center. Furthermore, the arm 88, having rotated counterclockwise, can rotate clockwise (clockwise) under the biasing force of the second spring 66 and return to its original position. In this embodiment, the second spring 66 is a coil spring. The second spring 66 is an example of the second biasing member of the present invention.

Figure 7A:
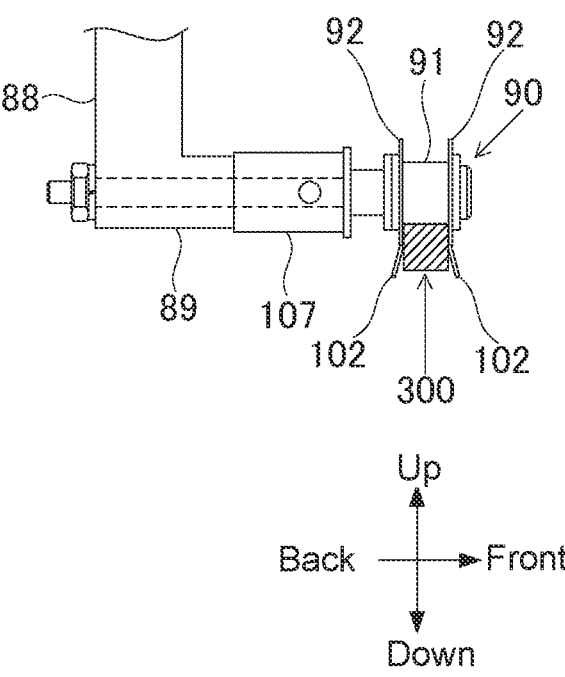
FIG. 7(A) is an explanatory diagram with a part of the left side of the tape material application unit omitted.
Figure 8:
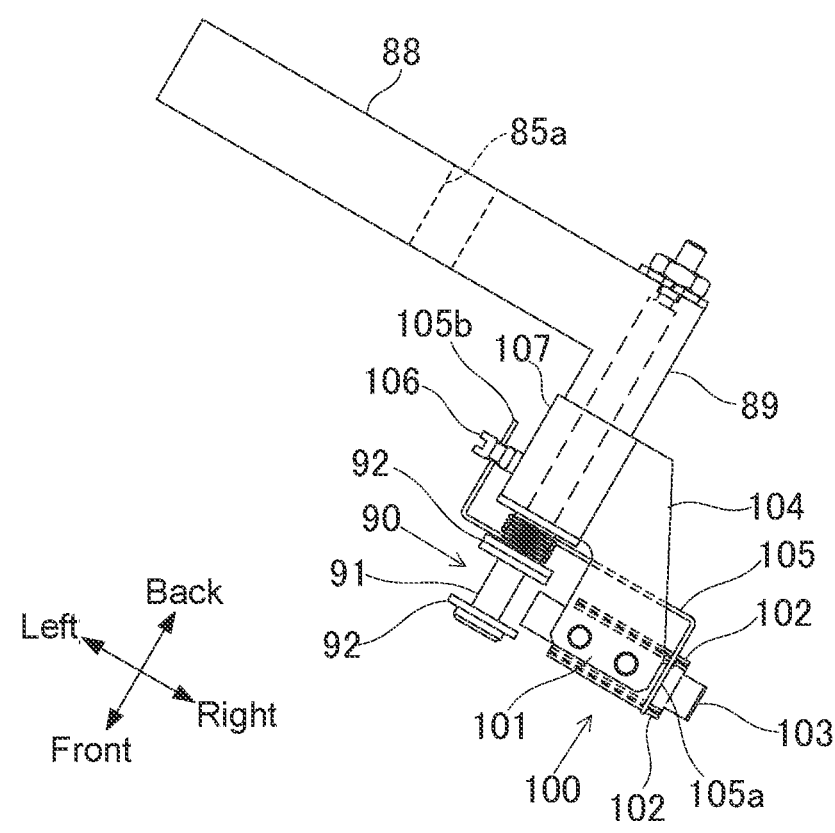
FIG. 8 is a plan view of the roller and guide.

As shown in FIG. 7(A) and FIG. 8, from the lower end of the arm 88, a bearing 89 is formed protruding forward, and the roller 90 is pivotally supported in the bearing 89. The arm 88 and the bearing 89, when viewed from the left side, present a substantially L-shaped appearance. Additionally, on the right side of the roller 90, a guide 100 is provided so that it can swing freely.

Furthermore, the first rotary shaft 64 for rotating the disk-shaped member 50 and the second rotary shaft 86 for rotating the arm 88 are parallel to each other. Each clamping fixture 201, the guide 100, and the roller 90 are positioned radially from the rotation center 51 of the disk-shaped member 50, and the guide 100 is positioned between the roller 90 and each clamping fixture 201.

[Structure of the Roller and Tape Material]

The roller 90 is a member for rolling while pressing the tape material 300 onto the workpiece 40, thereby applying the tape material 300 to the workpiece 40. As shown in FIG. 7(A) and FIG. 8, the roller 90 comprises a cylindrical body 91 and a pair of flanges 92, 92 protruding outwardly from each peripheral edge of both ends of the body 91. In this embodiment, it is made from an aluminum alloy known as A7075 in JIS (Japanese Industrial Standards), which is known for its high strength. Moreover, each flange 92 is formed from stainless steel known as SUS304 in JIS standards, which provides high corrosion resistance.

[Structure of the Tape Material]

Figure 7B:
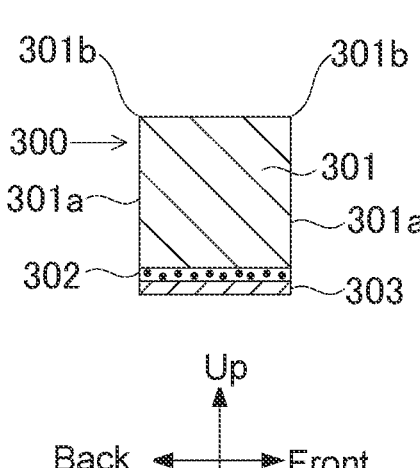
FIG. 7(B) is an enlarged cross-sectional view of the tape material.

As shown in FIG. 7(B), the tape material 300 consists of a urethane resin layer 301, which is the main body of the tape material, an adhesive layer 302 formed on the back surface of the urethane resin layer 301, and a release paper 303 adhered to the back surface of the adhesive layer 302. In the drawing, to make the structure of the tape material 300 more understandable, the thickness of the adhesive layer 302 and the release paper 303 are depicted as thicker than their actual size. The release paper 303 is separated from the tape material 300 when the tape material 300 is peeled off from the supply unit 34 (shown in FIG. 11).

In this embodiment, the adhesive layer 302 is formed from an acrylic-based adhesive, and the adhesive layer 302 has a higher modulus of elasticity than the urethane resin layer 301. The total length of the tape material 300, for example, ranges from 50 to 300 mm, the width is, for example, 5 to 15 mm, and the height excluding the release paper 303 is 5 to 10 mm. In other words, the tape material 300 handled in this embodiment is relatively short.

Furthermore, as the width of the body 91 of the roller 90 and the width of the tape material 300 are approximately the same, as shown in FIG. 7(A), each flange 92 of the roller 90 can grip the tape material 300 without any gap, ensuring that the tape material 300 does not move (or wobble) between the flanges 92. When the tape material 300 is held between the flanges 92, it protrudes downward from the peripheral surface of each flange 92, so when the roller 90 presses the tape material 300 onto the workpiece 40, the tape material 300 is compressed between the body 91 of the roller 90 and the workpiece 40, enabling the tape material 300 to be pressed onto the workpiece 40. Additionally, when the urethane resin layer 301 is compressed, it is possible to prevent each flange 92 of the roller 90 from coming into contact with the workpiece.

The roller 90 is designed such that the surface of the tape material 300 contacts the peripheral surface of the body 91, and at least the upper edges 301b, 301b of both side surfaces 301a, 301a of the tape material 300 in the longitudinal direction (shown in FIG. 7(B)) fit between the pair of flanges 92, 92. By configuring it in this way, when the tape material 300 is pressed and applied to the workpiece 40 by the roller 90, it can be prevented from dislodging outward from one of the flanges 92, allowing the tape material 300 to be accurately applied along the application path R. The dimensions such as the width and outer diameter of the body 91 of the roller 90, and the outer diameter of each flange 92, can be modified according to the width, height, and material of the tape material 300, which is the object to be pressed.

[Structure of the Guide]

The guide 100 is a member that holds the tape material 300 just before it is pressed by the roller 90, guiding the roller 90 to accurately press the tape material 300 along the application path R. As shown in FIG. 8, the guide 100 comprises an upper part 101 that contacts the surface of the tape material 300, a pair of side parts 102, 102 formed downward from both side edges of this upper part, a front-end part 103 protruding from the tip of the upper part 101 towards one end 304 of the tape material 300 (shown in FIG. 1), a cylindrical rotating part 107, and a flat connecting part 104. The rotating part 107 is pivotally mounted in the bearing 89, and this rotating part 107 is connected to the upper part 101 by the connecting part 104. The back surface of the upper part 101 is formed in a flat shape corresponding to the surface shape of the tape material 300, and each side part 102 is formed in a flat plate shape. As shown in FIG.

7(A), each side part 102 faces each other, and is provided to clamp both side surfaces 301a, 301a of the tape material 300 (shown in FIG. 7(B)).

Furthermore, the lower parts of each side section 102 are slightly inclined outwardly. The distance between the lower ends of each lower part is slightly wider than the width of the tape material 300. In other words, the guide 100 is structured to guide the tape material 300 from above between each side section 102, even if there is some variation in the width of the tape material 300, and to hold it with the side sections 102.

The front-end part 103 serves to guide the tape material 300 between the pair of side sections 102, 102 in a stable condition when applying the tape material 300 from the other end 305 to the workpiece. As shown in FIG. 1, the front-end part 103 is formed with a gently upwardly curved shape, or in other words, a slightly bulging downward curve, ensuring that the friction between the tip of the front-end part 103 and the surface of the tape material 300 does not become too great. Thus, it is designed to smoothly guide the tape material 300 between the pair of side sections 102, 102.

As shown in FIG. 8, a torsion coil spring 105 is mounted between the tip of the bearing 89 and the roller 90. The end 105a of the torsion coil spring 105 is secured to the upper part 101 at a position near the front-end part 103, while the base end 105b of the torsion coil spring 105 is locked to the spring locking section 106 attached to the rotating part 107. The guide 100 is biased downward by the torsion coil spring 105. This setup helps to maintain constant tension in the tape material 300 when it is being applied to the workpiece 40, especially when one end 304 of the tape material 300 is lifted by the tape material clamping device 200, thereby allowing stable guidance of the tape material 300 to the roller 90 (as shown in FIGS. 14 and 15). The guide 100 can be made from the same material as the body 91 or the flanges 92 of the roller 90. The guide 100 is an example of a holding member according to the present invention.

[Main Electrical Configuration of the Tape Material Applicator]

Next, the main electrical configuration of the tape material applicator 1 will be described with reference to FIG. 9, which shows it in block form.

The tape material applicator 1 is equipped with a control unit 500, to which the robot 10 is electrically connected. The tape material application unit 60 is electrically connected to the robot 10, and in turn, is electrically connected to the control unit 500. The control unit 500 controls the operation of the robot 10, and through the robot 10, it also controls the operation of the tape material application unit 60. The control states of the robot 10 and the tape material application unit 60 are fed back to the control unit 500.

The control unit 500 is equipped with a CPU 501 and a memory unit 502. The memory unit 502 includes various types of memory such as RAM, ROM, NVRAM, and SDRAM. The ROM stores the computer program 503, which is used by the CPU 501 to control the robot 10 and the tape material application unit 60.

Additionally, the control unit 500 is electrically connected to devices such as an area sensor 403, a door switch 404, an operation panel 405, a monitor 408, and a teaching pendant 409. The area sensor 403 is a sensor that detects whether people or objects are present within the working area of the tape material applicator 1. The door switch 404 detects the opening and closing of the door in the room where the tape material applicator 1 is installed. The operation panel 405 is equipped with various operation switches such as a start button (activation switch) to start the tape material applicator 1, an emergency stop button, and a manual switch to change from automatic to manual control. The monitor 408 displays the processing contents of the control unit 500, control program names, the current position and speed of the tape material applicator 1, information from various sensors, and other states of the tape material applicator 1. The control unit 500 is an example of the control part of the present invention.

The teaching pendant 409 is a device for providing teaching (instruction) to the tape material applicator 1. It includes a display section that shows the status of the tape material applicator 1 on an LCD or similar display, operation axis keys to operate axes 1 through 6, (as shown in FIG. 1), numeric keys for setting teaching programs and various working conditions, and keys to store the teaching content in the memory unit 502. Operators using the teaching pendant 409 perform teaching on the tape material applicator 1 to ensure the tape material 300 is applied along the set application path R on the workpiece 40, and this teaching content is stored as teaching data in the memory unit 502. For example, the teaching data includes parameters such as the distance between the roller 90 and the workpiece 40 when applying the tape material 300 along the application path R, the speed of application, and the direction of application. The operator conducts teaching at key points along the application path R using the teaching pendant 409 to obtain these parameters, and stores these acquired parameters as teaching data in the memory unit 502.

In this embodiment, the teaching data includes information for controlling the robot 10 and the tape material application unit 60 to move the tape material application unit 60 to the supply unit 34, to clamp one end 304 of the tape material 300, which is supplied by the supply unit 34, using the tape material clamping device 200, and to hold the other end 305 of the tape material 300 with the guide 100, as shown in FIG. 1.

Furthermore, the teaching data includes information to control the robot 10 such that when the tape material clamping device 200 clamps one end 304 of the tape material 300 while the guide 100 holds the other end 305, the disk-shaped member 50 is rotated clockwise. This control is to ensure that, while the guide 100 maintains its hold on the tape material 300, the robot 10 moves in a way that brings the tape material 300 closer to its clamping position by the tape material clamping device 200 (see FIG. 11).

Figure 12:
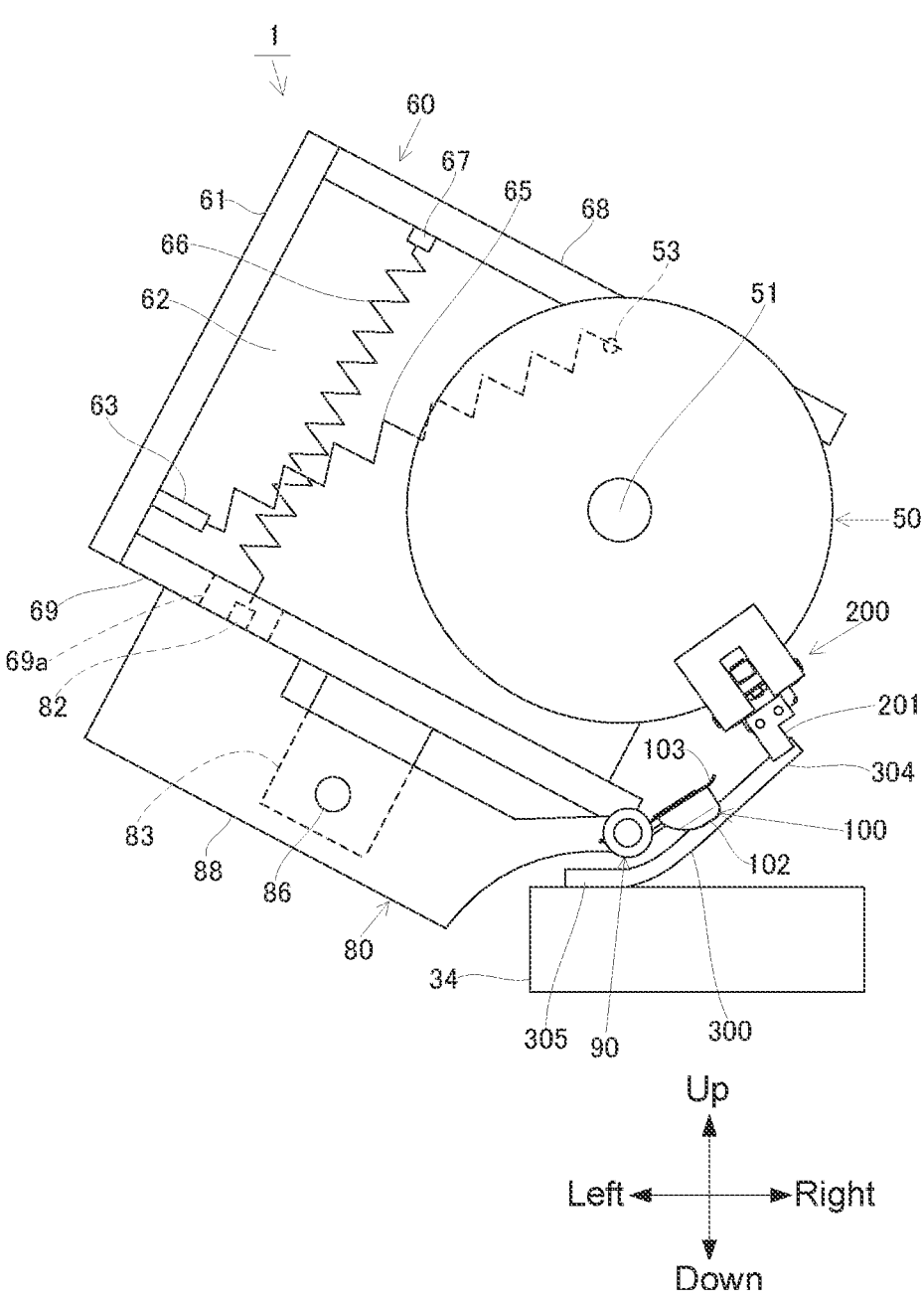
FIG. 12 is a perspective view showing the process of peeling the tape material from one end.
Figure 13:
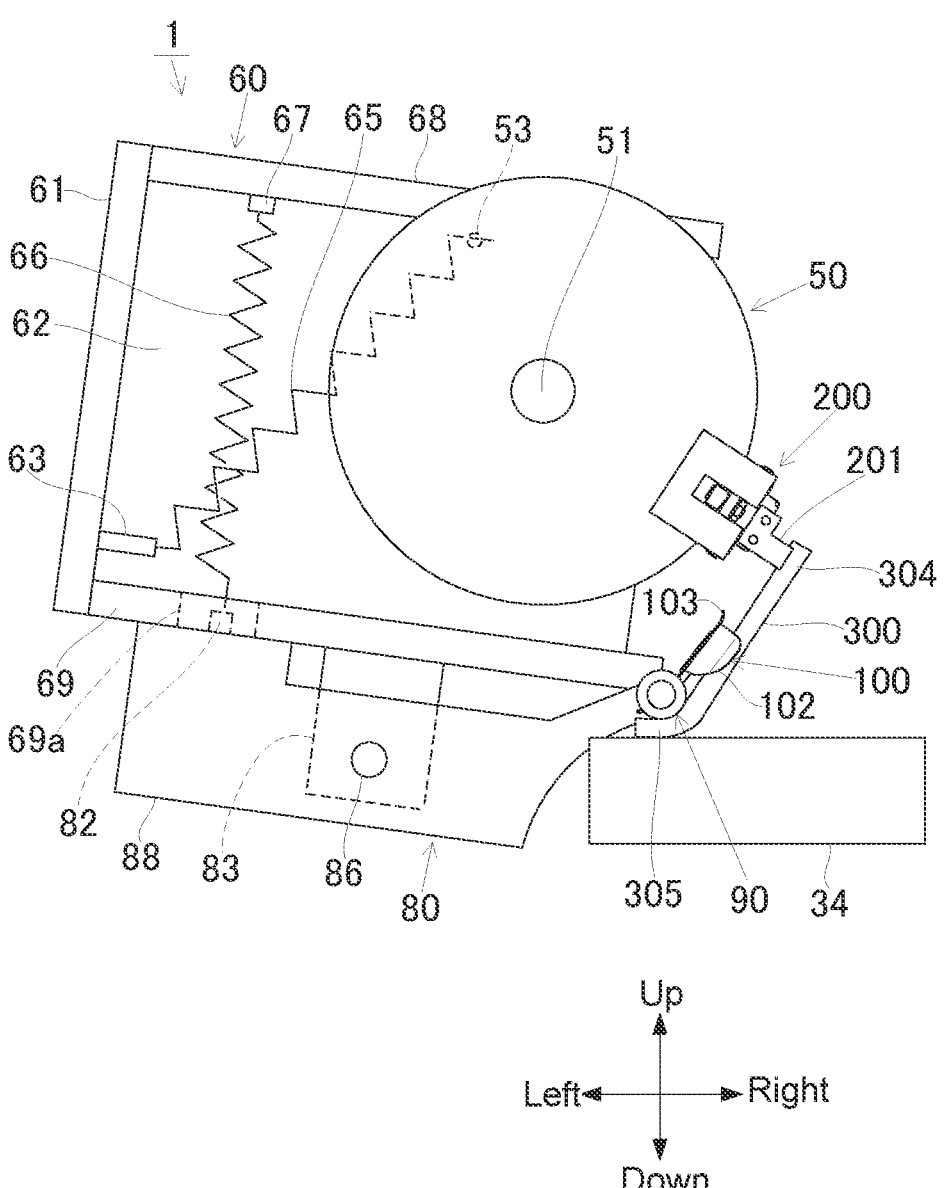
FIG. 13 is a perspective view showing the process of peeling the tape material from one end.

Furthermore, the teaching data includes information to control the robot 10 such that, by utilizing the biasing force of the first spring 65, the disk-shaped member 50 rotates back to its pre-rotation position. This action causes the tape material 300, which was clamped at one end 304 by each clamping fixture 201, to begin peeling from end 304. Simultaneously, the holding position of the tape material 300 by the guide 100 moves towards the other end 305 of the tape material 300 while still holding it, as depicted in FIGS. 12 and 13.

Additionally, the teaching data includes information for controlling the robot 10 so that, while each clamping fixture 201 continues to clamp one end 304 of the tape material 300 and the guide 100 maintains its hold on the other end 305, the tape material application unit 60 moves to the position where the tape material 300 is to be applied to the workpiece 40.

Moreover, the teaching data contains instructions for controlling the robot 10 to ensure each clamping fixture 201 maintains its clamp on one end 304 of the tape material 300, while the guide 100 continues to hold the other end 305. The tape material application unit 60 is directed to descend towards the workpiece 40, where the other end 305 of the tape material 300, held by the guide 100, is pressed against the workpiece 40 by the roller 90. (See FIG. 14(A).

In addition, the teaching data includes information for controlling the robot 10 to apply the tape material 300 from the other end 305 to the one end 304, pressing it with the roller 90 along the application path R (shown in FIG. 14(B), FIG. 15, and FIG. 16), while keeping the unattached portion of the tape material 300 elevated from the workpiece 40.

Furthermore, the teaching data includes instructions for controlling the robot 10 such that, if there is a curved section R1 within the application path R (as shown in FIG. 14(B)), the posture of the tape material application unit 60 is adjusted to follow the curvature of path R1. This process involves twisting the tape material 300 along the curved path R1 and having it pressed by roller 90, thus applying the tape material 300 along the curved path R1 (See FIG. 15). The CPU 501, based on the aforementioned teaching data and the computer program 503, controls the robot 10 and the air cylinder 203 to apply the tape material 300 along the application path R on the workpiece 40.

[Tape Material Application Process]

Next, the flow of the tape material application process executed by the CPU 501 (shown in FIG. 9) of the control unit 500 is described with reference to FIG. 10. In the following explanation, the process steps executed by CPU 501 are abbreviated as "S". As shown in FIG. 1, the tape material 300 is placed on the top surface of the supply unit 34 for supplying the tape material.

CPU 501 determines whether the start button (start switch) to activate the tape material applicator 1 is turned ON (S1) and, if it is determined to be ON (S1: Yes), checks whether the door switch 404 (shown in FIG. 9) is ON (S2). If CPU 501 determines that the door switch 404 is ON (S2: Yes), it then checks whether the area sensor 403 (shown in FIG. 9) is ON (S3) and, if it is determined to be OFF (S3: No), assesses whether tape material 300 is present on the top surface of the supply unit 34 (S4). This determination can be made, for example, by placing a tape material detection sensor on the top surface of the supply unit 34 to detect the presence of the tape material 300 and basing the decision on changes in the output signal from the tape material detection sensor. If CPU 501 determines that tape material 300 is present on the top surface of the supply unit 34 (S4: Yes), it starts the tape material application process based on the teaching data and the computer program 503 stored in the memory 502 (shown in FIG. 9) (S5).

Figure 11:
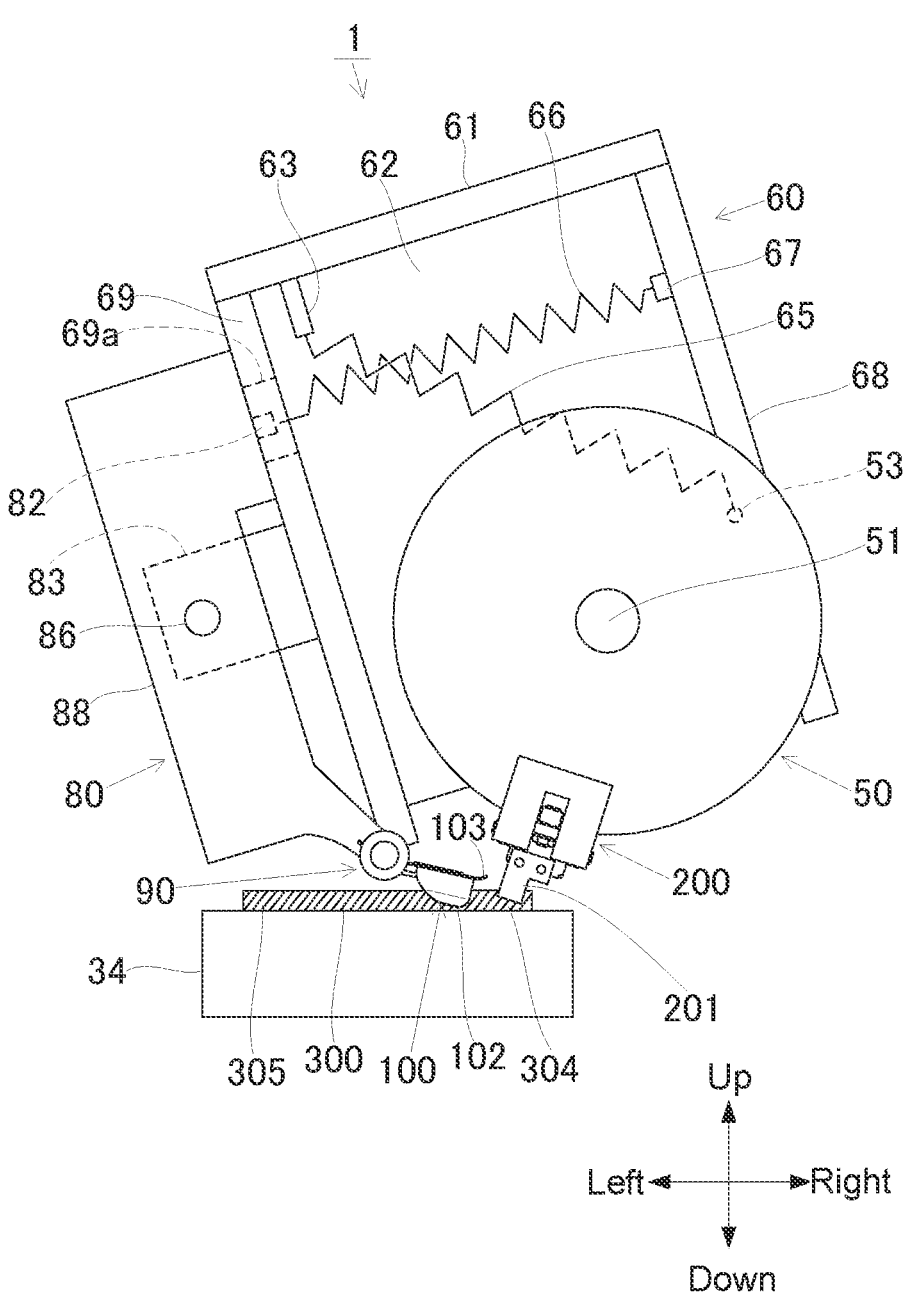
FIG. 11 is a perspective view showing the state where the clamping fixture of the tape material clamping device clamps one end of the tape material, and the guide holds the vicinity of one end of the tape material.

During the tape application process, as illustrated in FIG. 1, CPU 501 controls the robot 10 (shown in FIG. 9) to move the tape material application unit 60 towards the supply unit 34. This positioning allows each clamping fixture 201 of the tape material clamping device 200 to clamp one end 304 of the tape material 300, while the guide 100 holds the other end 305. Subsequently, CPU 501 activates the air cylinder 203 to enable each clamping fixture 201 to clamp one end 304 of the tape material 300. Following this, as depicted in FIG. 11, CPU 501 controls the robot 10 to move the tape material application unit 60 to the right, that is, in the direction from the other end 305 towards one end 304 of the tape material 300. During this movement, since each clamping fixture 201 of the tape material clamping device 200 is clamping one end 304 of the tape material, this clamping point acts as a fulcrum, causing the disk-shaped member 50 to rotate slightly clockwise (to the right), counteracting the biasing force of the first spring 65.

At this point, as the tape material application unit 60 moves to the right, as shown in FIG. 11, the guide 100, which had been holding the other end 305 of the tape material 300, moves toward the clamping position of the tape material 300 by each clamping fixture 201, that is, toward one end 304, while maintaining its hold on the tape material 300. As a result, as depicted, the guide 100 ends up holding a position close to one end 304 of the tape material 300.

In essence, the CPU 501 controls the robot 10 such that while each clamping fixture 201 clamps one end 304 of the tape material 300, and the guide 100 holds the part of the tape material 300 other than one end 304, the tape material application unit 60 is displaced. This action causes the guide 100, while holding the tape material 300, to approach the clamping position of the tape material 300 by each clamping fixture 201. The disk-shaped member 50 is rotated around the first rotary shaft 64 (FIG. 3), counteracting the biasing force of the first spring 65.

Subsequently, as shown in FIGS. 12 and 13, CPU 501 controls the robot 10 to slightly move the tape material application unit 60 upward and to the left. This action causes the disk-shaped member 50 to attempt to return to its pre-rotation posture under the biasing force of the first spring 65. Consequently, the tape material 300, which was clamped at one end 304 by each clamping fixture 201, begins to peel away from that end. Additionally, as the disk-shaped member 50 attempts to return to its pre-rotation posture, tension is applied to the tape material 300 clamped by each clamping fixture 201, preventing the tape material from sagging. Moreover, the guide 100, which was holding the tape material 300 near one end 304, moves towards the other end 305 while maintaining its hold on the tape material.

As such, CPU 501 controls the robot 10 such that by utilizing the biasing force of the first spring 65 to rotate the disk-shaped member 50 back to its pre-rotation posture, the tape material 300, which is adhered to the supply unit 34, begins to peel away from one end 304, which is clamped by the clamping fixtures 201, while the guide 100 maintains its hold on the tape material and shifts the holding position of the tape material 300 towards the other end 305.

Subsequently, CPU 501 controls the robot 10 to move the tape material application unit 60 to the position where the tape material 300 is to be applied to the workpiece 40, as illustrated in FIG. 14(A). This movement is executed while each clamping fixture 201 continues to clamp one end 304 of the tape material 300 and the guide 100 maintains its hold on the other end 305 of the tape material.

Continuing, CPU 501 controls the robot 10 to lower the tape material application unit 60 towards the workpiece 40. In this process, while each clamping fixture 201 still clamps one end 304 of the tape material 300 and the guide 100 maintains its hold on the other end 305, the tape material 300 at the other end 305 is pressed and applied to the workpiece 40 by the roller 90. Essentially, this step attaches the other end 305 of the tape material 300 to the starting point of the application path R set on the workpiece 40.

Furthermore, as shown in FIGS. 15 and 16, CPU 501 controls the robot 10 to apply the tape material 300 from the other end 305 to one end 304 along the application path R (as shown in FIG. 14(B)), while maintaining the unapplied portion of the tape material 300 elevated from the workpiece 40. Moreover, if there exists a curved segment within the application path R1, as indicated in FIG. 14(B), the robot 10 is controlled to adjust the posture of the tape material application unit 60 to follow this curved segment. This allows the tape material 300 to be twisted along the curved application path R1 at a position elevated from the workpiece 40, and then pressed by roller 90, ensuring the tape material 300 is applied following the curve of the path R1 (See FIG. 15).

Moreover, since arm 88 can rotate around the second rotary shaft 86 as its center of rotation and is biased by the second spring 66, the roller 90 can press the tape material 300 against the workpiece 40 with a consistent force. Additionally, even if there are unexpected protrusions in the application path R, or if there are thicker portions in the tape material 300 than specified, arm 88 rotates around the second rotary shaft 86, counteracting the biasing force of the second spring 66, thus preventing excessive pressure on the tape material 300 and the workpiece 40.

As shown in FIG. 16, when the pressing position of roller 90 approaches one end 304 of the tape material 300, and the unapplied portion remains minimal, CPU 501 drives the air cylinder 203 of the tape material application unit 60, returning each clamping fixture 201 to the unclamped state, and applies the remaining unapplied portion by pressing with roller 90. Subsequently, CPU 501 controls the robot 10 to move the tape material application unit 60 back to the supply unit 34.

Next, CPU 501 determines whether the conditions for ending the tape material application process are satisfied (S6), and if so (S6: Yes), the process is completed (S7). For example, the process can be programmed to end when the number of tape material 300 applications to the workpiece 40 reaches a target number pre-set in the memory unit 502 (FIG. 9). Alternatively, the process can be programmed to end when the tape material 300 supplied to the supply unit 34 is no longer detected by the tape material detection sensor.

Furthermore, if CPU 501 determines that the conditions for ending the tape material application process have not been met (S6: No), it will execute from S1 onward. Additionally, if CPU 501 determines that the start button is not ON (S1: No), or the door switch is not ON (S2: No), or the area sensor is ON (S3: Yes), the tape material application process is completed (S7).

[Effects of the Embodiment]

(1) In the embodiment described above, the tape material applicator 1 and computer program 503 enable the other end 305 of the tape material 300, held by the guide 100, to be pressed and applied to the workpiece 40 by the roller 90. While maintaining the unattached portion of the tape material 300 elevated from the workpiece 40, the position and posture of the tape material application unit 60 relative to the workpiece 40 are controlled. This allows the tape material 300 to be pressed and applied from the other end 305 to one end 304 along the application path R by the roller 90.

Consequently, the tape material applicator 1 in the described embodiment is capable of applying relatively short lengths of tape material.

(2) Furthermore, each clamping fixture 201, which clamps one end 304 of the tape material 300, only needs to be large enough to clamp one end 304 of the tape material. Similarly, the guide 100, which holds the other end 305 of the tape material 300, only needs to be large enough to hold the other end 305. Moreover, the roller 90, which presses the tape material 300 onto the workpiece 40, only needs to be large enough to apply this pressure. Therefore, even in situations where there are obstacles, such as protrusions, next to the tape material's application path R, the likelihood of interference between these obstacles and each of the clamping fixtures 201, the guide 100, and the roller 90 is relatively reduced.

Consequently, the tape material applicator 1, according to the aforementioned embodiment, can relatively reduce cases where applying the tape material is difficult.

(3) Moreover, in the tape material applicator 1 according to the aforementioned embodiment, the control unit 500 controls the robot 10 to displace the tape material application unit 60 while each clamping fixture 201 clamps one end 304 of the tape material 300 and the guide 100 holds the part of the tape material 300 other than end 304. This control enables the guide 100, while holding the tape material 300, to approach the clamping position of the tape material 300 by each clamping fixture 201, by rotating the disk-shaped member 50 around the first rotary shaft 64 against the biasing force of the first spring 65.

Consequently, when the tape material 300 is being peeled from one end 304 held by each clamping fixture 201, the guide 100 maintains its position near each clamping fixture 201. This ensures that the peeled tape material 300 does not detach from the guide 100.

(4) Furthermore, in the tape material applicator 1 according to the aforementioned embodiment, the control unit 500 can displace the tape material application unit 60 in such a way that, by rotating the disc-shaped member 50 back to its pre-rotation position utilizing the biasing force of the first spring 65, the tape material 300, adhered to the supply unit 34, is peeled from one end 304 clamped by each clamping fixture 201 while the guide 100 moves towards the other end 305 of the tape material 300, maintaining its hold on the tape material.

Consequently, a state is created where one peeled end 304 of the tape material 300 is clamped by each clamping fixture 201, and the other end 305 of the tape material 300 is held by the guide 100.

(5) Moreover, in the tape material applicator 1 according to the aforementioned embodiment, the control unit 500 can control the robot 10 so that each clamping fixture 201 clamps one end 304 of the tape material 300, and while the guide 100 holds the other end 305 of the tape material 300, the tape material application unit 60 can be moved to the position on the workpiece 40 where the tape material 300 is to be applied.

(6) Furthermore, in the tape material applicator 1 according to the aforementioned embodiment, the control unit 500 can control the robot 10 to press and apply the other end 305 of the tape material 300, held by guide 100, to the workpiece 40 using roller 90. Additionally, while keeping the portion of the tape material 300 that is not adhered to the workpiece 40 elevated (not attached to the workpiece 40), it can apply the tape material 300 along the application path R from its other end 305 to one end 304 by pressing with roller 90.

This means that in the tape material applicator 1 according to the aforementioned embodiment, the portion of the tape material 300 not adhered to the workpiece 40 remains elevated, allowing for easier change of direction during application due to reduced influence from the adhesive strength of the tape material 300.

Consequently, with the tape material applicator 1 according to the aforementioned embodiment, it is possible to precisely apply the tape material 300 along the application path R.

(7) Furthermore, in the tape material applicator 1 according to the aforementioned embodiment, when the tape material 300 is pressed onto the workpiece 40 by the roller 90, if the pressing force exceeds a predetermined level, the arm 88 counteracts the biasing force of the second spring 66 and rotates around the second rotary shaft 86, absorbing the excessive force.

Consequently, the tape material 300 can be applied to the workpiece 40 along the application path R with a consistent pressure, avoiding both the risk of crushing the tape material 300 due to excessive pressure, and the risk of inadequate adhesion due to insufficient pressure.

(8) Additionally, in the tape material applicator 1 according to the aforementioned embodiment, when peeling off the tape material 300 that is detachably adhered to the supply unit 34, the disk-shaped member 50 utilizes the force provided by the biasing force of the first spring 65 to return to its pre-rotation position. Consequently, there is no need for actuators such as motors to rotate the disk-shaped member 50, which reduces the manufacturing costs of the tape material applicator 1 and also lowers the failure rate.

(9) Furthermore, in the tape material applicator 1 according to the aforementioned embodiment, each clamping fixture 201, guide 100, and roller 90 are arranged radially from the rotation center 51 of the disc-shaped member 50. Moreover, since the guide 100 is positioned between the roller 90 and each clamping fixture 201, it is possible to hold the tape material 300 with the guide 100 while pressing it with the roller 90 by controlling the position and posture of the tape material applying unit 60. Additionally, by controlling the position and posture of the tape material applying unit 60, it is possible to move the holding position of the guide 100 along the tape material 300 while pressing the tape material 300 with the roller 90. Furthermore, by controlling the position and posture of the tape material applying unit 60, it is possible to control the position of each clamping fixture 201, which is clamping one end 304 of the tape material 300. Therefore, while maintaining the state where one end 304 of the tape material 300 is elevated from the workpiece 40, the direction of applying the tape material 300 can be controlled to follow the application path R.

(10) Furthermore, the tape material 300 comprises a urethane resin layer 301 and an adhesive layer 302 formed on the back surface of the urethane resin layer 301. In cases where the elasticity of the adhesive layer 302 is greater than that of the urethane resin layer 301, during application along a curved path R1, the urethane resin layer 301 can easily deform following the rolling direction of roller 90. However, since the adhesive layer 302 is less deformable, there is a risk that the adhesive layer 302, once attached to the workpiece 40, may have difficulty changing direction following the rolling direction of roller 90. This can lead to deviation from the application path R1 or cause the applied tape material 300 to tilt relative to the workpiece 40.

However, in the tape material applicator 1 according to the aforementioned embodiment, each clamping fixture 201 can clamp one end 304 of the tape material 300. This allows for the application of the tape material 300 from its other end 305 to the clamped end 304 along the application path R by pressing it with roller 90, while keeping the part of the tape material 300 that is not attached to the workpiece 40 elevated.

In other words, since the part not being pressed by roller 90 is not adhered to the workpiece 40, it is possible to easily change the direction of the unattached part by controlling the position and posture of the tape material applying unit 60.

Therefore, the aforementioned issues can be avoided, and the tape material 300 can be accurately applied along the curved application path R1.

(11) As described above, in the tape material applicator 1 according to the aforementioned embodiment, it is possible to apply relatively short lengths of tape material. Additionally, this tape material applicator can reduce the relative difficulty encountered in tape application.

[Other Embodiments]

(1) Depending on the type of workpiece 40, a horizontal multi-joint robot can be used instead of a vertical multi-joint robot as robot 10.

(2) Solenoids or piezo actuators can be used instead of air cylinders.

(3) A sensor for detecting deviation of the applied tape material 300 from the application path R (for example, an image sensor) can be installed in the tape material applicator 1. Additionally, a notification device (such as a lamp, an alarm sound output device, etc.) to alert users of the sensor's detection results can also be provided.

DESCRIPTION OF REFERENCE NUMERALS

1: Tape Material Applicator
10: Robot
34: Supply Unit
40: Workpiece
50: Disk-shaped Member
60: Tape Material Application Unit
64: First Rotary Shaft
65: First Spring
66: Second Spring
80: Roller Swing Mechanism
86: Second Rotary Shaft
88: Arm
90: Roller
100: Guide
200: Tape Material Clamping Device
201: Clamping Fixture
203: Air Cylinder
215: Cam
216: Cam Follower
300: Tape Material
301: Urethane Resin Layer
302: Adhesive Layer
303: Release Paper
304: One End
305: Other End
500: Control Unit
501: CPU
502 Memory Unit
503: Computer Program
R: Application path
R1: Curved application path

The invention claimed is:

1. A tape material applicator that applies tape material having an adhesive layer on a back surface, to a workpiece along a predefined application path using a robot, comprising:

an application mechanism mounted at the tip of the robot for applying the tape material to the workpiece; and
a control unit, wherein the tape material comprises:

a urethane resin layer formed of urethane resin; and
an adhesive layer formed on the back surface of the urethane resin layer,
the adhesive layer having a greater elastic modulus than the urethane resin layer, wherein the application mechanism includes:

a clamping device equipped with a clamping member for clamping one end of the tape material and a driving device for operating the clamping member;
a holding member capable of holding the other end of the tape material; and
a roller for pressing and applying the tape material to the workpiece, wherein the control unit controls the robot and the driving device to clamp one end of the tape material in the clamping member and to hold the other end of the tape material in the holding member, and further controls the robot to move the application mechanism to the position where the tape material is to be applied to the workpiece, wherein the other end of the tape material held by the holding member is pressed and applied to the workpiece by the roller, while maintaining the unapplied portion of the tape material in a state of being elevated from the workpiece, and wherein the position and posture of the application mechanism relative to the workpiece are controlled, thus applying the tape material from the other end to the one end by pressing with the roller along the application path.

2. The tape material applicator according to claim 1, having the tape material detachably adhered to a supply unit for supplying the tape material, wherein the application mechanism comprises:

a first rotary member with the clamping member positioned radially from the center of rotation;
a first rotary shaft that pivotally supports the first rotary member to enable its rotation;
a first biasing member urging the first rotary member, which rotates with the clamping member clamping the tape material, to return to its pre-rotation position;
a second rotary member provided with the holding member and roller at one end;
a second rotary shaft allowing rotation of the other end of the second rotary member; and
a second biasing member urging the second rotary member, which rotates when the roller presses the tape material onto the workpiece, to return to its pre-rotation position, wherein the control unit controls the robot to clamp one end of the tape material in the clamping member and hold the part of the tape material other than one end in the holding member, displacing the application mechanism so that the holding member, while holding the tape material, approaches the clamping position of the clamping member, rotating the first rotary member around the first rotary shaft against the biasing force of the first biasing member, and by rotating the first rotary member back to its pre-rotation position using the biasing force of the first biasing member, the tape material, which is adhered to the supply unit, is peeled from one end being clamped by the clamping member while the holding position of the tape material by the holding member moves to the other end of the tape material in its held state, thus displacing the application mechanism, and the clamping member clamps one end of the tape material and the holding member holds the other end, moving the application mechanism to the position for applying the tape material to the workpiece, and the other end of the tape material held by the holding member is pressed and applied to the workpiece by the roller, while maintaining the unapplied portion of the tape material elevated from the workpiece, and the tape material is applied from the other end to one end by pressing with the roller along the application path.

3. The tape material applicator according to claim 2, wherein the first rotary shaft and the second rotary shaft are mutually parallel, and the clamping member, the holding member, and the roller are each positioned radially from the center of rotation of the first rotary member, with the holding member being positioned between the roller and the clamping member.

4. A computer program executed by the control unit of a tape material applicator comprising:

an application mechanism mounted at the tip of a robot for applying the tape material to the workpiece to apply tape material having an adhesive layer on its back surface, to a workpiece along a predefined application path using a robot; and a control unit;

wherein the tape material comprises:

a urethane resin layer formed of urethane resin; and an adhesive layer formed on the back surface of the urethane resin layer, the adhesive layer having a greater elastic modulus than the urethane resin layer, wherein the application mechanism includes:

a clamping device equipped with a clamping member for clamping one end of the tape material;

a driving device for operating the clamping member;

a holding member capable of holding the other end of the tape material; and a roller for pressing and applying the tape material to the workpiece;

wherein the computer program executed by the control unit:

controls the robot and the driving device to clamp one end of the tape material in the clamping member and to hold the other end of the tape material in the holding member, moves the application mechanism to the position for applying the tape material to the workpiece, presses and applies the other end of the tape material held by the holding member to the workpiece with the roller, while maintaining the unapplied portion of the tape material elevated from the workpiece, and controls the position and posture of the application mechanism relative to the workpiece, thus applying the tape material from the other end to one end by pressing with the roller along the application path.

* * * * *